(12) United States Patent
Ode et al.

(10) Patent No.: US 7,710,910 B2
(45) Date of Patent: May 4, 2010

(54) WIRELESS BASE STATION AND WIRELESS COMMUNICATION METHOD

(75) Inventors: Takayoshi Ode, Kawasaki (JP); Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 994 days.

(21) Appl. No.: 11/387,963

(22) Filed: Mar. 24, 2006

(65) Prior Publication Data

US 2007/0121538 A1    May 31, 2007

(30) Foreign Application Priority Data

Nov. 30, 2005    (JP)    ............................ 2005-345325

(51) Int. Cl.
*H04B 7/212*    (2006.01)
(52) U.S. Cl. ...................... 370/323; 370/208; 370/328; 370/476
(58) Field of Classification Search ................. 370/323, 370/476, 328, 208
See application file for complete search history.

(56) References Cited

U.S. PATENT DOCUMENTS

| 7,180,913 B2* | 2/2007 | Benvenuti et al. ........... 370/476 |
|---|---|---|
| 2002/0136176 A1 | 9/2002 | Abeta et al. .................. 370/335 |
| 2003/0002454 A1* | 1/2003 | Lee et al. ...................... 370/328 |
| 2004/0131110 A1 | 7/2004 | Alard et al. .................. 375/149 |
| 2005/0088960 A1* | 4/2005 | Suh et al. .................... 370/208 |
| 2005/0094552 A1 | 5/2005 | Abe et al. .................... 370/208 |
| 2006/0013338 A1 | 1/2006 | Gore et al. ................... 375/324 |

FOREIGN PATENT DOCUMENTS

| EP | 1 542 488 A1 | 6/2005 |
|---|---|---|
| JP | 08-223108 A | 8/1996 |
| JP | 11-112460 A | 4/1999 |
| JP | 2000-151548 | 5/2000 |

OTHER PUBLICATIONS

European Search Report dated Apr. 4, 2007 (8 pages).

* cited by examiner

*Primary Examiner*—David Q Nguyen
(74) *Attorney, Agent, or Firm*—Myers Wolin, LLC

(57) ABSTRACT

A wireless base station that performs data communication using a plurality of sub carriers, and repeatedly generates frame patterns comprising one combination or more of at least two types of frames in which the number of common pilots in each is different, and transmits data for mobile terminals having poor receiving quality in a frame having a large number of common pilots, and transmits data for mobile terminals having good receiving quality in a frame having a small number of common pilots.

3 Claims, 27 Drawing Sheets

FIG. 15

| CQI | NUMBER OF TBS BITS | NUMBER OF CODES | MODULATION TYPE |
|---|---|---|---|
| 1 | 137 | 1 | QPSK |
| 2 | 173 | 1 | QPSK |
| 3 | 233 | 1 | QPSK |
| ... | ... | ... | ... |
| 14 | 2583 | 4 | QPSK |
| 15 | 3319 | 4 | QPSK |
| 16 | 3565 | 5 | 16-QAM |
| 17 | 4189 | 5 | 16-QAM |
| ... | ... | ... | ... |
| 29 | 24222 | 15 | 16-QAM |
| 30 | 25558 | 15 | 16-QAM |

WIRELESS BASE STATION AND WIRELESS COMMUNICATION METHOD

BACKGROUND OF THE INVENTION

This invention relates to a wireless communication method and wireless base station, and more particularly to a wireless base station and wireless communication method that performs data communication using sub-carriers.

In a Digital Terrestrial Television system or an OFDM communication system that uses OFDM (Orthogonal Frequency-Division Multiplexing), measurement of the receiving power of the signal, controlling the receiving power, and channel estimation are performed using a time-division multiplexed common pilot signal as the transmission signal.

FIG. 29 is a drawing showing the construction of a transmission apparatus in an OFDM communication system, where a data-modulation unit 1 modulates the transmission data (user data or control data) using QPSK modulation, and converts the transmission data to a plurality of baseband signals (symbols) having an in-phase component and quadrature component. A time-division-multiplexing unit 2 performs time-division multiplexing of the pilots of a plurality of symbols in front of the data symbols. A serial-to-parallel converter 3 converts input data to parallel data of M symbols, and outputs M sub-carrier samples $S_0$ to $S_{M-1}$. An IFFT (Inverse Fast Fourier Transform) unit 4 performs IFFT (inverse fast Fourier transformation) processing of the sub-carrier samples $S_0$ to $S_{M-1}$ that were input in parallel and combines them to output a discrete-time signal (OFDM signal). A guard-interval insertion unit 5 inserts a guard interval into the M symbol long OFDM signal that was input from the IFFT unit 4, and a transmission unit (TX) 6 performs DA conversion of the OFDM signal inserted with a guard interval, and converts the frequency of the OFDM signal from baseband to the wireless band, then performs high-frequency amplification and transmits the signal from an antenna 7.

FIG. 30 is a drawing explaining the serial-to-parallel conversion, where a common pilot P is time multiplexed in front of one frame of transmission data. In the case where the common pilot per frame is 4×M symbols, and the transmission data is 28×M symbols, the M symbols of the pilots are output from the serial-to-parallel converter 3 the first four times as parallel data, and after that the M symbols of the transmission data are output 28 times as parallel data. As a result, the pilots in one frame period can be time multiplexed on all of the sub carriers and transmitted 4 times, and on the receiving side the channel is estimated for each sub carrier using those pilots, and channel compensation (fading compensation) becomes possible. An OFDM symbol is configured with M symbols.

FIG. 31 is a drawing explaining the insertion of guard intervals. Guard-interval insertion is copying the end section to the start section of an IFFT output signal that corresponds to M sub-carrier samples (=1 OFDM symbol). By inserting guard intervals GI, it is possible to do away with the effect of symbol interference due to a multipath.

FIG. 32 is a drawing showing the construction of an OFDM receiving apparatus. The signal that is output from the transmission antenna 7 is received by the receiving antenna 8 of the receiving apparatus via a fading propagation path, and a receiving circuit (Rx) 9 converts the RF signal that was received from the antenna to a baseband signal, and performs AD conversion to convert that baseband signal to a digital signal, then an FFT timing synchronization circuit 10, which extracts the signal of a desired band from the signal after AD conversion, detects the FFT timing from a time domain signal that includes the signal of the desired band that is output from the receiving circuit 9, and a symbol-extraction unit 11 extracts the OFDM symbols at FFT timing and inputs them to an FFT unit 12. The FFT unit 12 performs FFT (fast Fourier transformation) processing for each extracted OFDM symbol, and converts the signal to frequency domain sub-carrier samples $S_0'$ to $S_{M-1}'$. By calculating the correlation between the pilot symbols that were received during a set interval and a pre-known pilot pattern, a channel-estimation circuit 13 estimates the channel for each sub carrier, and a channel-compensation circuit 14 uses the estimated channel value to compensate for channel fluctuations of the data symbols. By the above processing, transmission data that is distributed by each sub carrier is demodulated. After that, the demodulated sub-carrier signals (not shown in the figure) are converted to serial data, and decoded. The example above is a process in which pilots are used in channel estimation, however, they can also be used in measuring the received signal power, SN ratio or the like.

As shown in FIG. 33, when pilot symbols exist at only the start and/or end of a frame, the receiving power of the data between pilots is estimated by the receiving power of the pilots. As shown by the solid line A in FIG. 34, when the speed of movement of a mobile station is slow, for example, walking speed (approximately 4 km/h), the time-variation interval of the received electric field intensity E becomes long, the variation width becomes small, and sudden drops decrease, so it is easy to estimate the receiving power of the pilot symbols. However, as shown by the dashed line B in FIG. 34, when the speed of movement of a terminal is fast, the time-variation interval becomes short and the variation width becomes large. Furthermore, it becomes easy for sudden drops to occur. As a result, the precision of estimating the receiving power between pilot symbols decreases. Also, the channel estimation precision decreases, and since decoding and demodulation are performed using these poor estimation results, the quality of communication decreases. In other words, when moving at high speed, the channel estimation precision decreases and thus the communication quality and throughput decrease. A detailed case will be explained below.

A case is presumed in which communication is performed with a base station having 100 terminals inside a cell, where 50 of the terminals are moving at high speed, and the remaining 50 terminals are moving at low speed or are still. The channel estimation precision of the terminals moving at high speed decreases, as well as the quality of communication decreases and the transmission speed decreases. Here, supposing that it is not possible to maintain the required communication quality for 25 of the high speed terminals, and the transmission speed becomes 0, the overall transmission speed throughput of the base station becomes 0.75. Hereupon it is assumed that the throughput is 1 when all of the terminals are moving at low speed or are still. In this way, when the interval between pilot symbols is long, the communication quality of terminals moving at high speed decreases, and the overall transmission speed (throughput) of the base station decreases.

First Prior Art

In regards to the problem described above, a method is feasible, as shown in FIG. 35, in which the interval between common pilot symbols is narrowed, and the number of pilot symbols is increased. However, in this method the following problems exist, so this method is not desirable.

(1) The pilot symbols are common pilot symbols, so the number of symbols increases regardless of whether or not the terminal is moving at high speed.

(2) Data is decreased by the amount that pilot symbols are added, so the actual transmission speed decreases.

A detailed example will be explained below.

Supposing that the overall transmission speed of a wireless frame is 10 Mbps. Then here, the ratio between the normal number of pilot symbols and the number of data symbols is taken to be 0.1:0.7. The remaining 0.2 is the control signal. Therefore, the actual transmission speed is 7 Mbps.

Next, as countermeasures for high-speed movement, the interval between pilot symbols is narrowed, and 2× the number of pilot symbols are inserted. By doing this, the aforementioned ratio becomes 0.2:0.6, and the actual transmission speed drops to 6 Mbps. Therefore, even though some terminals may be moving at low speed, when pilots are added and inserted as a countermeasure for high-speed movement, the actual transmission speed becomes 1 Mbps (15%) less than 7 Mbps. As described above, by simply just adding pilot symbols, a drop in actual transmission speed, as well as a decrease in throughput occurs. Therefore, the overall transmission speed (throughput) of the base station decreases.

To handle this problem, a method has been proposed that performs variable control of the number pilot symbols according to the propagation environment (see JP 2000-151548A and JP 2005-027294A). This method measures the propagation environment, and performs control so that when the propagation environment is poor, it increases the number of pilots, and when it is good, decreases the number of pilots. However, the number of symbols is increased or decreased for each individual mobile station, so control is complicated. Particularly, there is a problem in that since the number of symbols is increased or decreased for each individual mobile station, scheduling control becomes difficult.

Second Prior Art

Also, in regards to terminals moving at high speed, as shown in (a) of FIG. 36, a method has been proposed in which, in addition to common pilots P, dedicated pilots PD are added between the common pilots (see JP 2001-197037A). However, in this method of inserting dedicated pilots, control must be performed of measuring the propagation environment and inserting dedicated pilots when the environment is poor, and not inserting pilots when the environment is good. Therefore, as in the first prior art, control of each individual mobile terminal is necessary, and there is a problem in that together with the control being complicated, scheduling control becomes difficult. Also, the insertion position where the dedicated pilots are inserted is treated as a special position, and when dedicated pilots are not inserted, then as shown in (b) of FIG. 36, a special control signal is inserted, thus data decreases and transmission speed drops. In other words, for terminals moving at low speed, data cannot be inserted in the positions where the dedicated pilots are inserted, so as a result, the same problem occurs as in the case when the interval between pilot symbols is narrowed and the number of pilot symbols is increased.

SUMMARY OF THE INVENTION

Taking the above into consideration, the object of the present invention is to use a fixed frame pattern and control the number of pilot symbols.

Another object of the present invention is to use a fixed frame pattern, and increase the number of pilot symbols or the number of distributions of pilot symbols for terminals having poor receiving quality, for example terminals moving at high speed, and decrease the number of pilot symbols or the number of distributions of pilot symbols for terminals having good receiving quality, for example terminals moving at low speed, in order to prevent a decrease in throughput of a base station.

Another object of the present invention is to use a fixed frame pattern, and with simple control, increase the number of pilot symbols or number of distributions of pilot symbols for terminals having poor receiving quality, for example terminals moving at high speed, so that accurate measurement of receiving quality, receiving power, and channel estimation can be performed.

Another object of the present invention is to make it possible to easily perform scheduling control.

With this invention, the aforementioned objectives are accomplished by a wireless-communication method for a wireless base station, which performs data communication with mobile terminals, comprising steps of combining one or more of at least two types of frames in which the number of common pilots in each is different, or at least two types of frames in which the number of distributions of common pilots in each is different; and mapping data on each frame and repeatedly transmitting each combination to mobile terminals.

Also, with this invention, the aforementioned objectives are accomplished by a wireless-communication method for a wireless base station, which performs data communication using a plurality of sub carriers, comprising steps of dividing said plurality of sub carriers into two groups, making the number of common pilots or the number of distributions of common pilots in the frames configured with the first group of sub carriers and in the frames configured with the second group of sub carriers different, mapping data on the respective frames configured with said first and second groups of sub carriers, and repeatedly transmitting the data to mobile terminals.

In the wireless-communication method described above, the wireless base station assigns frames having a large number of common pilots or a large number or distributions of common pilots to mobile terminals having poor receiving quality, and assigns frames having a small number of common pilots or a small number of distributions of common pilots to mobile terminals having good receiving quality, and notifies the respective mobile terminals of said assigned frames.

In the wireless-communication method described above, the wireless base station groups the mobile terminals according to each of the frames of said combination, and performs transmission scheduling for each group based on the receiving quality measurement results that were reported from the mobile terminals.

In the wireless-communication method described above, the wireless base station sets the combination of frames and assigns frames to respective mobile terminals based on the receiving state of mobile terminals in a cell that are performing communication, and notifies the mobiles terminals of said set combination of frames and the frames assigned to the respective mobile terminals.

Also, with this invention, the aforementioned objectives are accomplished by a wireless base station, which performs data communication with mobile terminals, and comprises: a frame-pattern-generation unit that repeatedly generates a frame pattern having one combination or more of at least two types of frames in which the number of common pilots in each is different, or at least two types of frames in which the number of distributions of common pilots in each is different; a mapping unit that maps data onto each frame; and a transmission unit that transmits the frame pattern on which data is mapped to the mobile terminals.

Moreover, with this invention, the aforementioned objectives are accomplished by a wireless base station, which performs data communication with mobile terminals using a plurality of sub carriers, and comprises: a frame-pattern-generation unit that repeatedly generates two types of frame patterns, a first and second frame pattern, in which the number of common pilots or the number of distributions of common pilots is different in each; a mapping unit that divides a plurality of sub carriers into two groups, and maps data on frames configured with the sub carriers of the first group based on the first frame pattern, and maps data on frames configured with the sub carriers of the second group based on the second frame pattern; and a transmission unit that performs frequency-division multiplexing of the frames on which data is mapped, and transmits the data to mobile terminals.

According to this invention, at least two types of frames, in which the number or common pilots is different in each, or at least two types of frames in which the number of distributions of common pilots is different in each, are combined into one combination or more, and data is mapped on to each frame and each combination is repeatedly sent to mobile terminals, so it is possible to use a fixed frame pattern to control the number of pilot symbols.

Moreover, according to this invention, a plurality of sub carriers are divided into two groups, and the number of common pilots or the number of distributions of common pilots in a frame configured with the sub carriers of the first group, and in a frame configured with the sub carriers of the second group differ, and data is mapped on the respective frames configured with the sub carriers from the first and second groups and repeatedly transmitted to mobile terminals, so it is possible to use a fixed frame pattern to control the number of pilot symbols.

According to this invention, frames having a large number of common pilots or a large number of distributions of common pilots are assigned to mobile terminals having poor receiving quality, and frames having a small number of common pilots or a small number of distributions of common pilots are assigned to mobile terminals having good receiving quality, and data for the mobile terminals is mapped on the respective frame and transmitted, so with simple control using a fixed frame pattern, it is possible to increase the number of pilot symbols for terminals having a poor receiving environment, for example, terminals moving at high speed, and thus it is possible to perform accurate measurement of the receiving quality, measurement of the receiving power, and channel estimation.

With this invention, mobile terminals are grouped according to each of the frames of the aforementioned combination, and transmission scheduling is performed based on the receiving quality measurement results for each group that were reported from the mobile terminals, so it is possible to easily control the transmission schedule for each frame of a fixed frame pattern.

Also, with this invention, the combination of frames of the aforementioned combination is set, and mobile terminals are set for each frame based on the receiving state of the mobile terminals in a cell that are performing communication, the mobile terminals are notified of the set frame combination and the frames assigned to respective mobile terminals, so the most suitable combination is set and communication is performed based on the receiving state of the mobile terminals in a cell performing communication, and thus it is possible to improve the throughput of the base station.

Other features and advantages of the present invention will be apparent from the following description taken in conjunction with the accompanying drawings.

BRIEF DESCRIPTION OF THE DRAWINGS

FIG. 15 is a drawing explaining a CQI table.

DESCRIPTION OF THE PREFERRED EMBODIMENTS

According to the present invention, in a wireless base station that performs data communication using sub carriers, is used a frame pattern FRPT which comprises one combination or more of at least two kinds of frames having different numbers of common pilots, or at least two kinds of frames having different numbers of distributions of common pilots. A frame having a large number of common pilots, or a frame having a large number of distributions of common pilots is assigned for terminal having poor receiving quality, and a frame having a small number of common pilots, or a frame having a small number of distributions of common pilots is assigned for terminal having good receiving quality, and data for a mobile terminal is mapped onto each frame and transmitted repeatedly.

Figure 1:
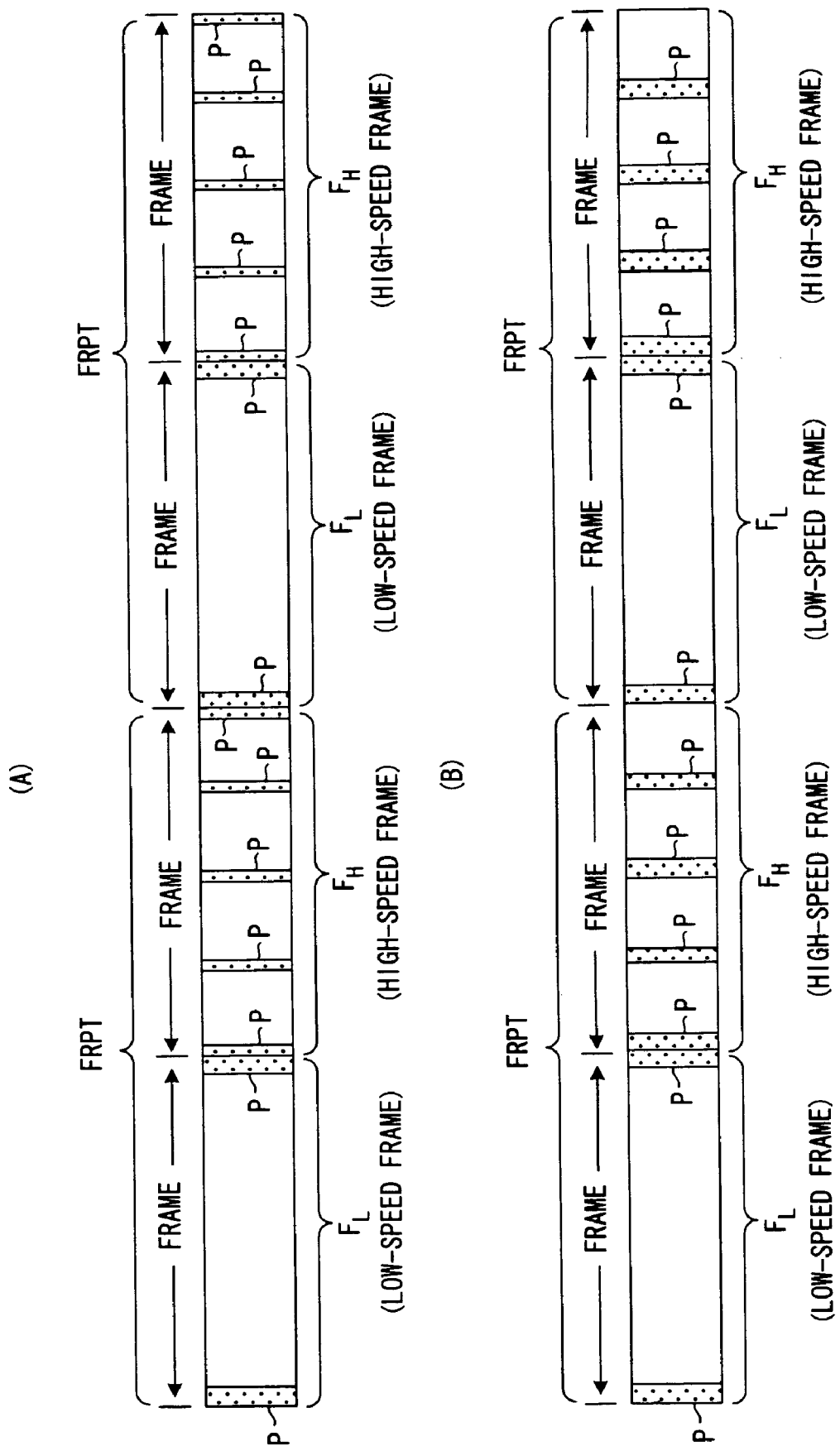
FIG. 1 is a drawing showing the construction of the fixed frame pattern FRPT of this invention.

FIG. 1 is a drawing showing the construction of a fixed frame pattern FRPT of this invention, and in (A) of FIG. 1, the number of common pilots in one frame is the same, and a plurality of frames $F_L$, $F_H$ having different arrangements of pilot symbols are alternately arranged.

Frames $F_L$ have a small number of distributions of pilot symbols P, and are frames for mobile terminals having a good propagation environment, for example terminals moving at low speed; and frames $F_H$ have a large number of distributions of pilot symbols P, and are frames for mobile terminals having a poor propagation environment, for example terminals moving at high speed.

The fluctuation interval of the receiving power in a terminal that is moving at high speed is short, and the oscillation width becomes large. Therefore, data for a terminal that is moving at high speed is mapped onto a frame $F_H$ for which it is possible to shorten the interval for measuring the receiving power. On the other hand, the fluctuation interval of the receiving power in a terminal that is moving at low speed is long, and the oscillation width becomes small. Therefore, data for a terminal that is moving at low speed is mapped onto a frame $F_L$ for low-speed movement. Also, a fixed frame pattern FRPT, which comprises these two frames $F_L$, $F_H$ as one combination, is repeated and transmitted. By doing this, it becomes possible to improve the measurement precision for measuring the receiving power, and improve the channel-estimation precision, as well as improve communication quality for both terminals moving at high speed and terminals moving a low speed. Moreover, the number of pilot symbols is the same for both frames $F_L$, $F_H$, so it is possible to make the data-transmission speed the same during low-speed movement and high-speed movement.

An example of making the number of pilot symbols in a frame $F_H$ for terminals moving at high speed greater than the number of pilot symbols in a frame $F_L$ for terminals moving at low speed, and increasing the number of distributions, is shown in (B) of FIG. 1. With the frame pattern shown in (B) of FIG. 1, the data transfer speed for terminals moving at high speed decreases, however, since there is a large number of pilot symbols, it is possible to measure the receiving power and perform channel estimation with high precision.

The number of frames $F_L$ and $F_H$ in a fixed frame pattern FRPT does not have to be the same. In the case of a large number of mobile terminals having a good propagation environment, the number of frames $F_L$ can be greater than the number of frames $F_H$, and when there is a large number of mobile terminals having a poor propagation environment, the number of frames $F_H$ can be greater than the number of frames $F_L$.

(A) Embodiment 1

Frame Pattern FRPT

Figure 2:
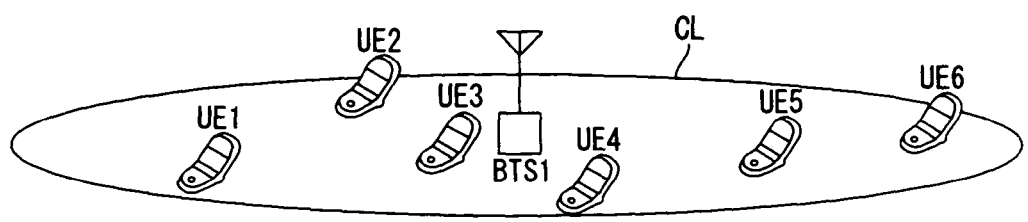
FIG. 2 is a drawing explaining a wireless communication system such as OFDM that uses sub carriers.

FIG. 2 is a drawing explaining a wireless communication system such as OFDM that uses sub carriers, where mobile stations (mobile terminals) UE1 to UE6 communicate with a base station BTS1 in a cell CL. It is assumed that mobile station UE1 is in a still state, and that mobile stations UE2 and UE3 are moving at walking speed (approximately 4 km/h), these mobile stations can be taken to be moving at low speed. On the other hand, mobile stations UE4 to UE6 are moving in an automobile (60 km/h), and these mobile stations are defined as moving at high speed. Here the ratio of terminals moving at low speed to terminals moving at high speed is 1:1.

Figure 3:
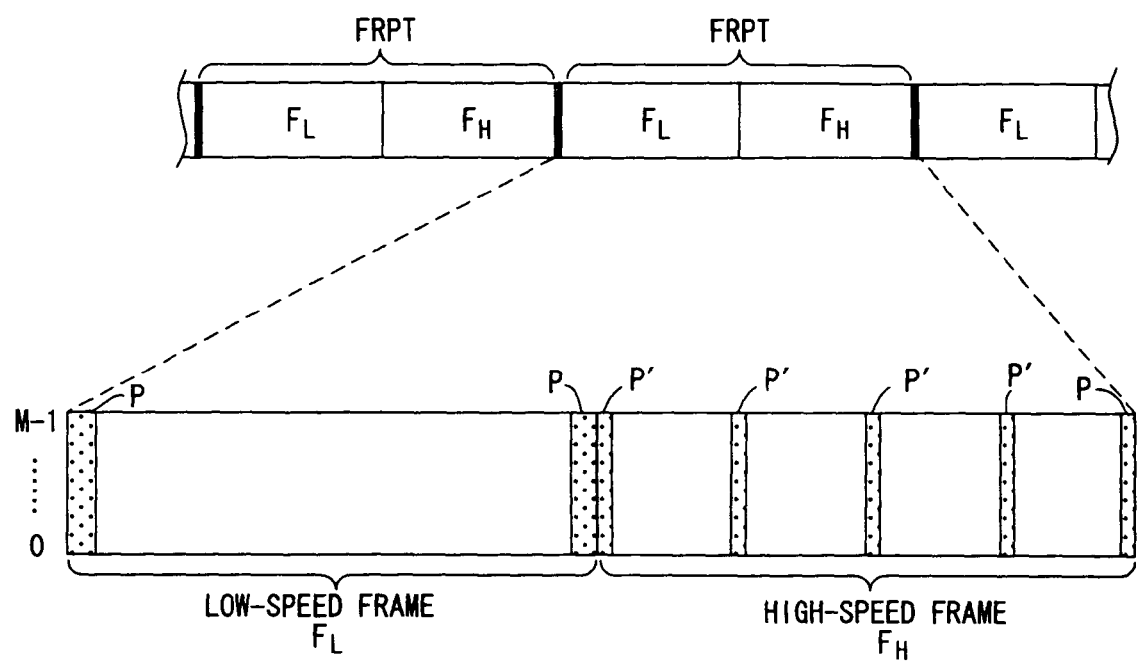
FIG. 3 is a drawing explaining a fixed frame pattern.
Figure 33:
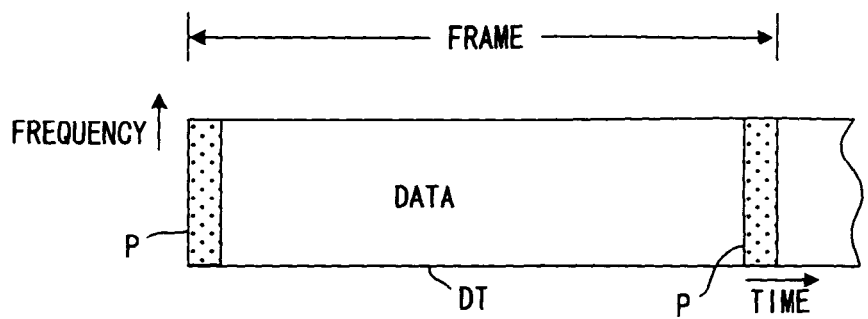
FIG. 33 is a drawing explaining a frame in which pilot symbols exist at only the start and end of the frame.
Figure 34:
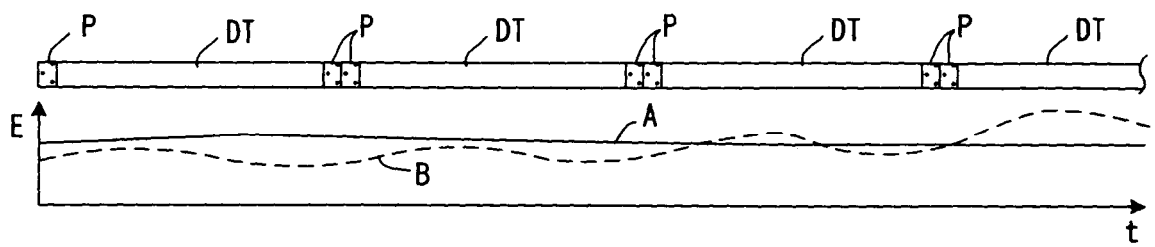
FIG. 34 is a drawing explaining the problem in the frame shown in FIG. 33.
Figure 35:
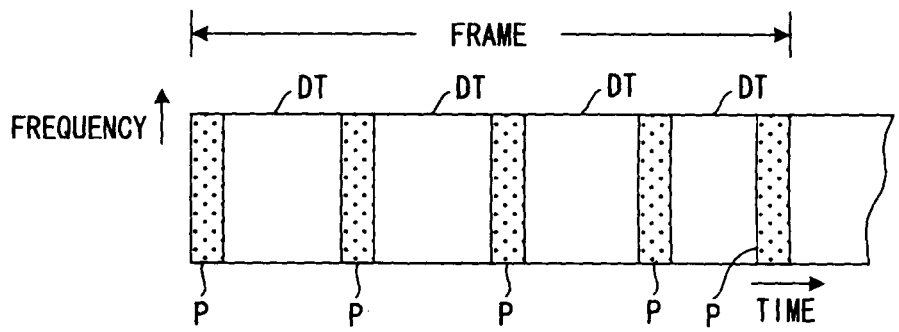
FIG. 35 is a drawing explaining a frame in which the interval between common pilots is narrowed and the number of pilot symbols is increased.
Figure 36:
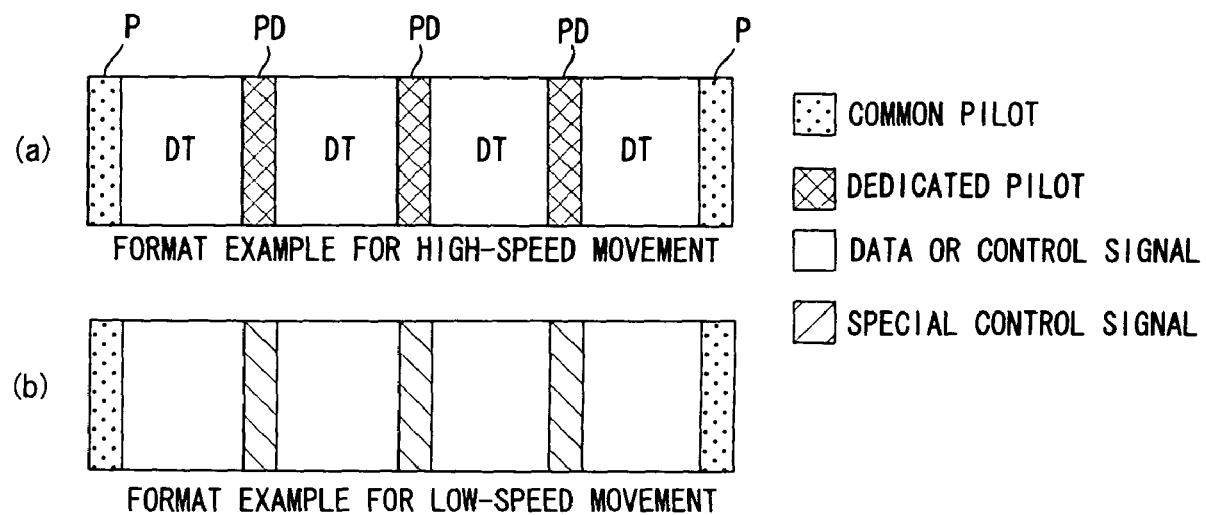
FIG. 36 is a drawing explaining a frame in which, in addition to common pilots P, dedicated pilots PD are added between the common pilots.

When the ratio of the number of mobile stations moving at low speed to the number of mobile stations moving at high speed is 1:1, then as shown in FIG. 3, a fixed frame pattern FRPT comprising a combination of one frame $F_L$ for low speed and one frame $F_H$ for high speed, is generated repeatedly and transmitted. In each frame, the horizontal direction is time (OFDM symbol) the same as shown in FIG. 33, and the vertical direction is sub carriers, and one frame is configured with 32 OFDM symbols, for example, and one OFDM symbol is configured with M sub carriers.

In the frames $F_L$, $F_H$, the number of OFDM symbols of the common pilots is the same, however, the arrangement patterns are different from each other, so that in a frame $F_L$ for low speed, common pilot symbols P are placed at just two locations, before and after the frame, however, in a frame $F_H$ for high speed, five common pilot symbols P' are placed evenly spaced in one frame. This is because the fluctuation interval of the received electric field intensity for terminals moving at low speed is long, and the oscillation width is also small, so the interval between pilot symbols can be made long, whereas for terminals moving at high speed, the fluctuation interval of the received electric field intensity is short and the oscillation width is large, so the measurement interval for measuring receiving power must be short. As shown in (B) of FIG. 1, the number of OFDM symbols of common pilots in a frame $F_L$ for low speed and a frame $F_H$ for high speed can be different.

Figure 4:
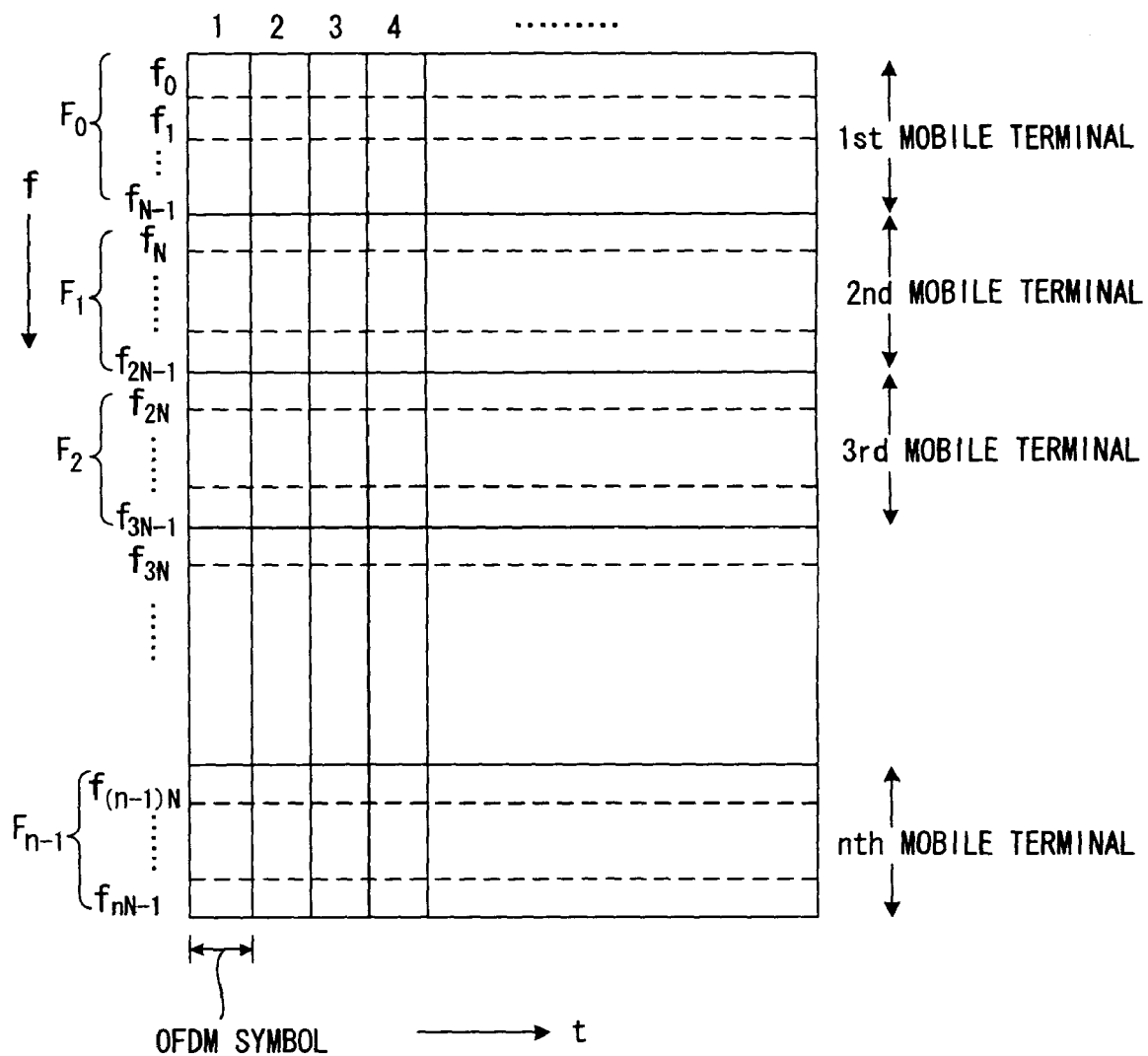
FIG. 4 is a drawing explaining frequency-division multiplexing

Data for a plurality of mobile terminals moving at low speed is multiplexed in a frame $F_L$ for low speed, and data for a plurality of mobile terminals moving at high speed is multiplexed in a frame $F_H$ for high speed. As multiplexing methods, there is frequency-division multiplexing, code-division multiplexing, and time-division multiplexing. FIG. 4 is a drawing explaining frequency-division multiplexing, where the M number (=n×N) of sub carriers $f_0$ to $f_{nN-1}$ of each OFDM symbol is divided among n groups $F_0$ to $F_{n-1}$ with N sub carriers for each, and frequency-division multiplexing is performed by mapping data for specified terminals in the group of sub carriers for each group $F_0$ to $F_{n-1}$.

In FIG. 3, pilots are arranged in all of the sub carriers, or in other words, are arranged continuously in the frequency direction, however, it is also possible to arrange pilots at set intervals or non-set intervals.

Construction of a Base Station BTS

Figure 5:
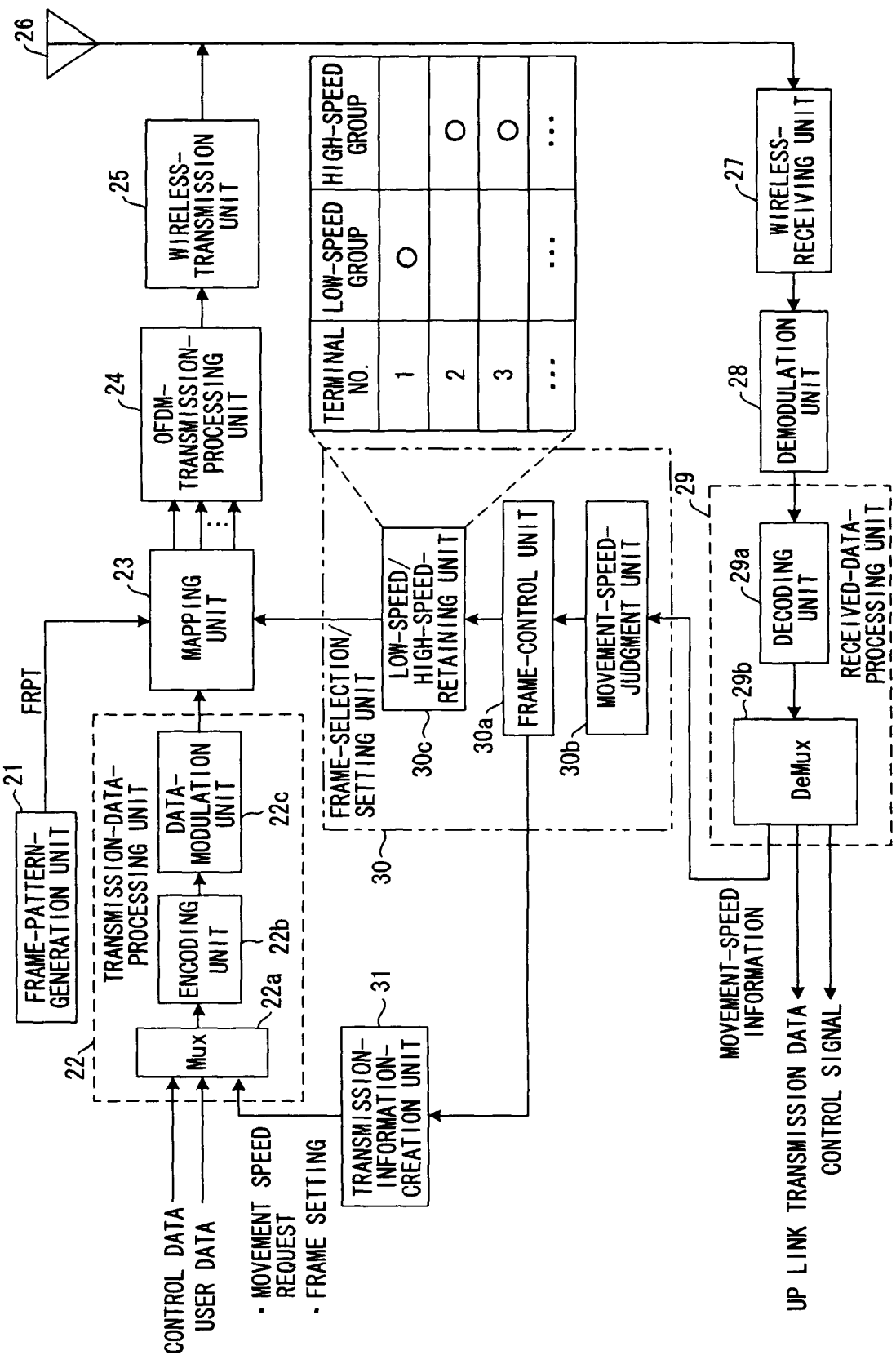
FIG. 5 is a drawing showing the construction of a base station BTS of a first embodiment.

FIG. 5 is a drawing showing the construction of a base station BTS, where, as shown in FIG. 3, a frame-pattern-generation unit 21 repeatedly generates a frame pattern FRPT in which pilot symbols are inserted in appropriate places. A transmission-data-processing unit 22 comprises a multiplexing unit 22a, encoding unit 22b and data-modulation unit 22c; where the multiplexing unit 22a multiplexes control data, user data and other data (hereafter referred to as movement-speed-request data, and used-frame-setting data); the encoding unit 22b encodes the data that is output from the multiplexing unit 22a, and the data-modulation unit 22c performs data modulation of the encoded data using QPSK modulation, 16QAM modulation or the like. A mapping unit 23 maps data in specified sub carriers (see FIG. 4) of the OFDM symbols of a frame $F_H$ for high speed or a frame $F_L$ for low speed in the frame pattern FRPT depending on whether the mobile station that is the destination of the user data is a high-speed mobile terminal or a low-speed mobile terminal. An OFDM transmission unit 24 performs IFFT processing and combines n×N number of sub carriers, and after combination, inserts guard intervals GI in the time signal, and a wireless-transmission unit 25 performs frequency-up conversion of the frequency of the baseband signal to a wireless frequency, then amplifies and transmits the signal from an antenna 26.

A wireless receiving unit 27 performs frequency-down conversion of the frequency of the wireless signal received from the mobile station to a baseband frequency, and a demodulation unit 28 performs a demodulation process on the baseband signal. A received-data-processing unit 29 comprises: a decoding unit 29a, and a separation unit 29b; where the decoding unit 29a performs an error-correction decoding process on the demodulated result, and then from the decoded result, the separation unit 29b separates and outputs the data transmitted from the user, control data and movement-speed data.

A frame selection/setting unit 30 comprises a frame control unit 30a, movement-speed-judgment unit 30b and low-speed/high-speed-retaining unit 30c. The frame-control unit 30a periodically requests the movement speed of each of the mobile stations, and based on the movement speed, sets frames for the mobile stations to use. The movement-speed-judgment unit 30b determines, based on the movement speeds $V_{UEi}$ (i=1, 2, . . . ) received from the mobile stations and the size of a threshold value Vth, whether a mobile station is moving at high speed or low speed, and inputs the judgment results to the frame-control unit 30a. The frame-control unit 30a divides the mobile stations into low-speed and high-speed groups, and the low-speed/high-speed-retaining unit 30c determines for each terminal whether it belongs to the low-speed group or high-speed group. The mapping unit 23, based on the contents of the low-speed/high-speed-retaining unit 30c, identifies the group to which the destination mobile station for the downloaded user data belongs to, and maps the data in the specified frame $F_H$ or $F_L$ of the frame pattern FRPT.

A transmission-information-creation unit 31 creates movement-speed-request data when the movement speed is requested from the frame-control unit 30a, and transmits that data to the mobile stations via the transmission-data-processing unit 22. Also, the transmission-information-creation unit 31 creates used-frame-setting data for notifying the mobile stations that a notification has been given from the frame-control unit 30a to set frames for the mobile stations, and for notifying the mobile stations of those frames, and sends that data to the mobile stations by the transmission-data-processing unit 22.

Construction of a Mobile Station

Figure 6:
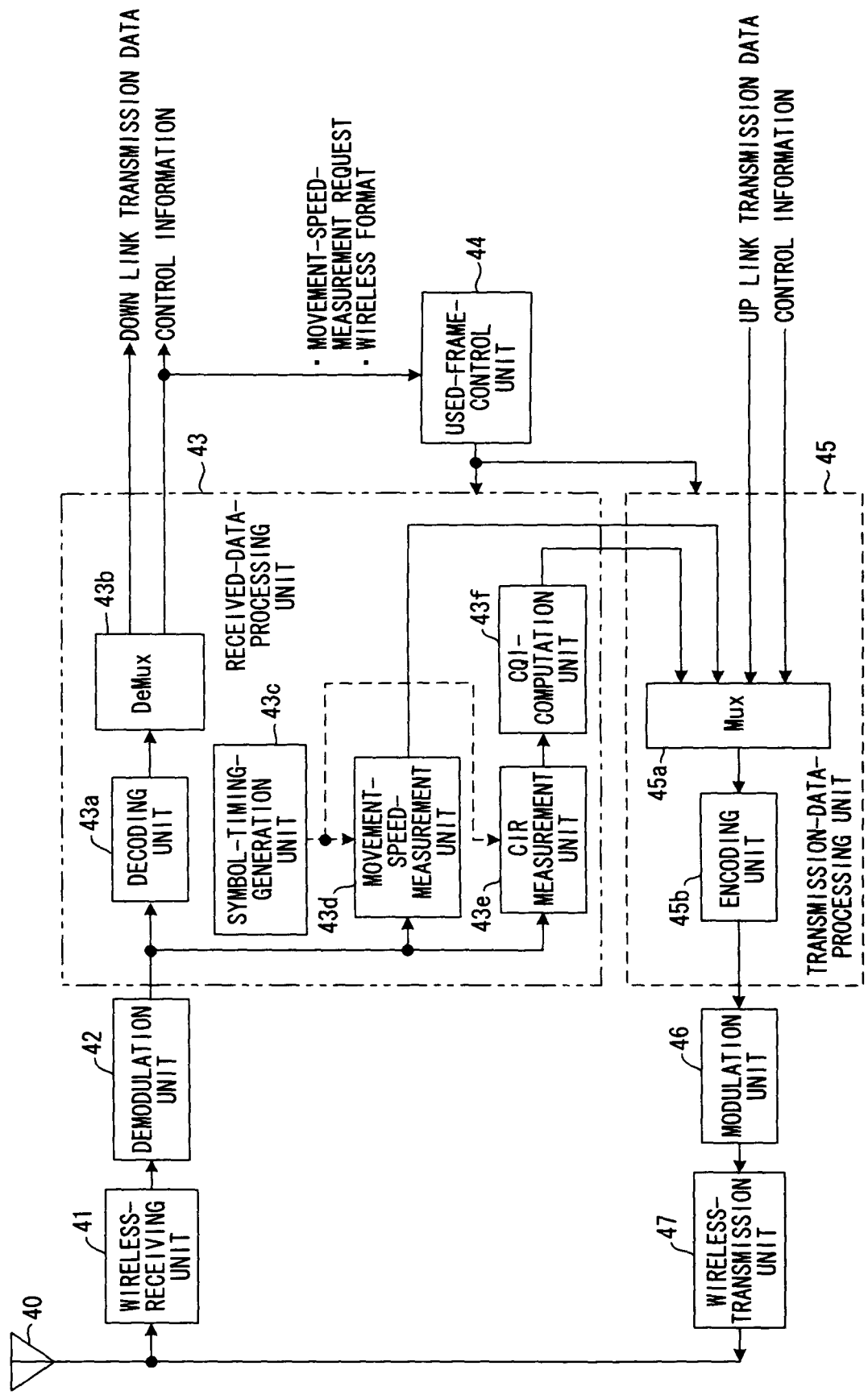
FIG. 6 is a drawing showing the construction of a mobile station of a first embodiment.

FIG. 6 is a drawing showing the construction of a mobile station, where a wireless-receiving unit 41 converts a wireless signal that is received by an antenna 40 from the base station to a baseband signal, and a demodulation unit 42 demodulates the received signal from the baseband signal. A received-data-processing unit 43 comprises a decoding unit 43a, a separation unit 43b, a symbol-timing-generation unit 43c, movement-speed-measurement unit 43d, CIR measurement unit 43e, and CQI-computation unit 43f. The decoding unit 43a performs an error-correction-decoding process on the demodulated results, and demodulates the received data, then the separation unit 43b separates and outputs the user data and control data. The symbol-timing-generation unit 43c generates symbol timing for the frames $F_H$, $F_L$ of the frame pattern FRPT, and the movement-speed-measurement unit 43d estimates the movement speed by using pilot symbols to measure the interval of dropping received electrical field intensity (fading pitch). The detailed method for measuring the speed of movement is well known (refer to Japanese patent application No. H10-79701 (U.S. Pat. No. 6,335,923B2) so no detailed explanation of it will be given here. The CIR-measurement unit 43e uses pilot symbols to measure the carrier to interference ratio (CIR), and the CQI-computation unit 43f computes the CQI (Channel Quality Indicator) value according to the CIR. It is also possible to measure SIR, and to compute the CQI value from that SIR. CQI has a value between 1 to 30, and becomes greater the better CIR or SIR is, and based on the CQI value, the base station sets the transport block size (number of bits) TBS, the number of multi codes (in the case of code-division multiplexing), and the demodulation type. Scheduling processing for a base station that uses this CQI is explained in the explanation of Embodiment 3.

When the used-frame-control unit 44 receives movement-speed-request data from the base station, it gives an instruction to the movement-speed-measurement unit 43d to measure the movement speed, and the movement-speed-measurement unit 43d uses the pilot symbols in the currently used frame to measure the movement speed. Also, when the used-frame-control unit 44 receives frame-setting data from the base station BTS instructing which frame to use, it inputs that frame to the movement-speed-measurement unit 43d, CIR-measurement unit 43e, channel-estimation unit (not shown in the figure) or receiving power-measurement unit (not shown in the figure).

The transmission-data-processing unit 45 comprises a multiplexing unit 45a and an encoding unit 45b, where the multiplexing unit 45a multiplexes control data, up user data, and other data (movement speed, CQI value), and the encoding unit 45b encodes the output data that is output from the multiplexing unit 45a. A demodulation unit 46 performs QPSK demodulation or the like on the transmission data, and a wireless-transmission unit 47 converts the demodulated signal to a wireless signal and amplifies it, then transmits it from the antenna 40.

It is not shown in the figure, however, the mobile stations also comprise a channel-estimation unit that uses the pilots included in its own frame to estimate the channel, a channel-compensation unit that performs channel compensation based on the estimated channel value, a receive-power-measurement unit that uses pilots to measure the receiving power, and a receiving power-control unit that controls the receiving power based on the receiving power that was measured.

Frame Setting Sequence

Figure 7:
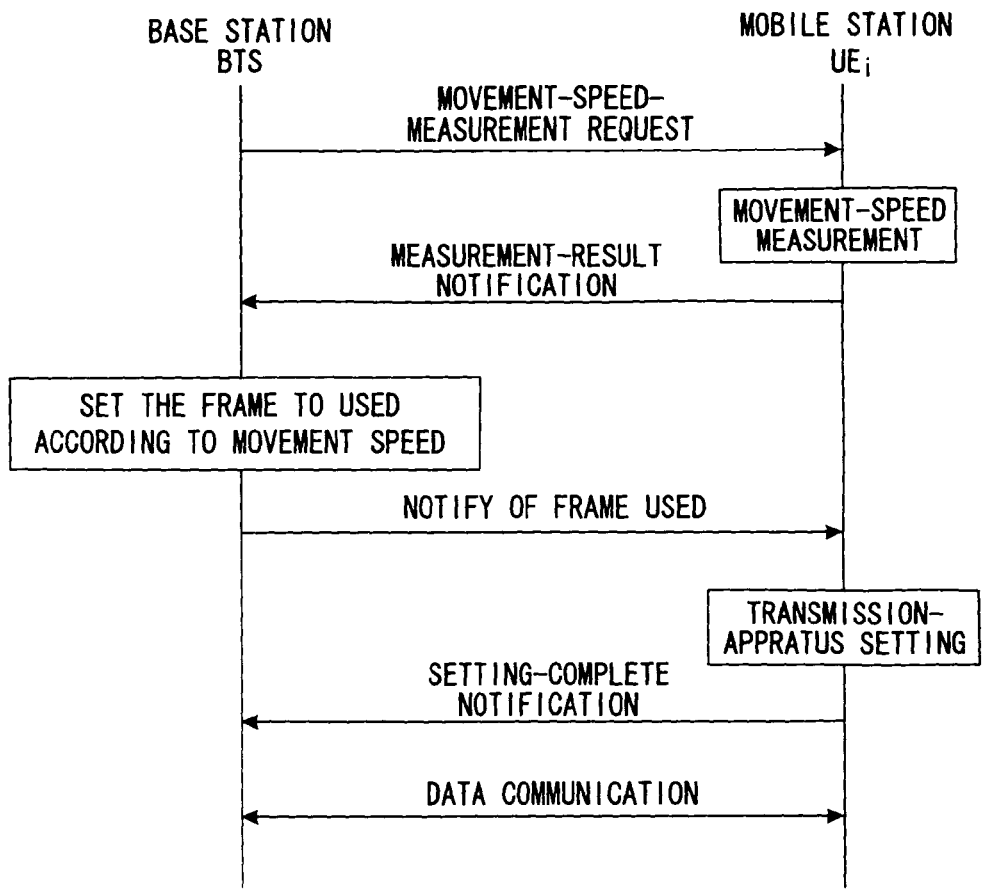
FIG. 7 is a drawing explaining the frame setting sequence for a base station BTS with respect to a mobile station UEi.

FIG. 7 is a drawing explaining the frame-setting sequence for a base station BTS with respect to the mobile stations UEi.

The wireless base station BTS sends a request to each of the mobile stations UEi (i=1, 2, . . . ) to measure the movement speed. Each of the mobile stations UEi that received that request measure their respective movement speed $V_{UE1}$ to $V_{UE6}$, and notifies the base station BTS. The base station BTS compares the movement speed transferred from a mobile station with a threshold value Vth, and determines whether that mobile station is moving at high speed or low speed. In other words when $$Vth \geq V_{UEi}$$

it determines that the mobile station UEi is moving at low speed, and when $$Vth < V_{UEi}$$

it determines that the mobile station UEi is moving at high speed, and then using this result, the base station BTS groups each of the mobile stations UEi into terminals moving at high speed and terminals moving at low speed. Then the base station BTS sets a frame to be used for each of the mobile stations UEi according to that movement speed, and notifies the mobile station of that result. For example, in the case of mobile station UE2 in FIG. 2, $Vth \geq V_{UE2}$ so the base station BTS determines that the mobile station UE2 is moving at low speed and sends an instruction to mobile station UE2 to use a frame $F_L$ for low speed. Also, in the case of mobile station UE5, $Vth < V_{UE5}$ so the base station BTS determines that the mobile station UE5 is moving at high speed, and sends an instruction to mobile station UE5 to use a frame $F_H$ for high speed.

Each of the mobile stations UEi sets the frame in the transmission unit and reception unit according to the instruction from the base station BTS, and when setting is finished, sends a notification to the base station BTS that setting is finished.

After that, the base station BTS multiplexes the user data in the corresponding frame $F_H$ or $F_L$ and sends it to the destination mobile station, and each mobile station UEi uses the instructed frame in the aforementioned sequence to perform communication. Also, at the same time that data communication is being performed, it uses the pilots in the frame $F_H$ or $F_L$ assigned to itself to measure the receiving power or estimate the channel. The base station and each of the mobile stations continue communication by periodically performing the aforementioned sequence.

In the frame instruction method described above, the frame identification number for a low-speed frame $F_L$ can be taken to be 0, and the frame identification number for a high-speed frame $F_H$ can be taken to be 1, and the frame identification number can be notified. Also, it is possible to perform notification of each frame according to whether it is used or not used.

Multiplexing Method

As the method for multiplexing down link transmission data for a mobile station there is frequency-division multiplexing, code-division multiplexing, and time-division multiplexing, and in FIG. 4, frequency-division multiplexing is explained. In other words, in the mapping unit 23 shown in FIG. 5, frequency-division multiplexing can be performed by mapping down link transmission data for a plurality of mobile stations in sub carriers in n number of groups $F_0$ to $F_{n-1}$ of each OFDM symbol (see FIG. 4).

Figure 8:
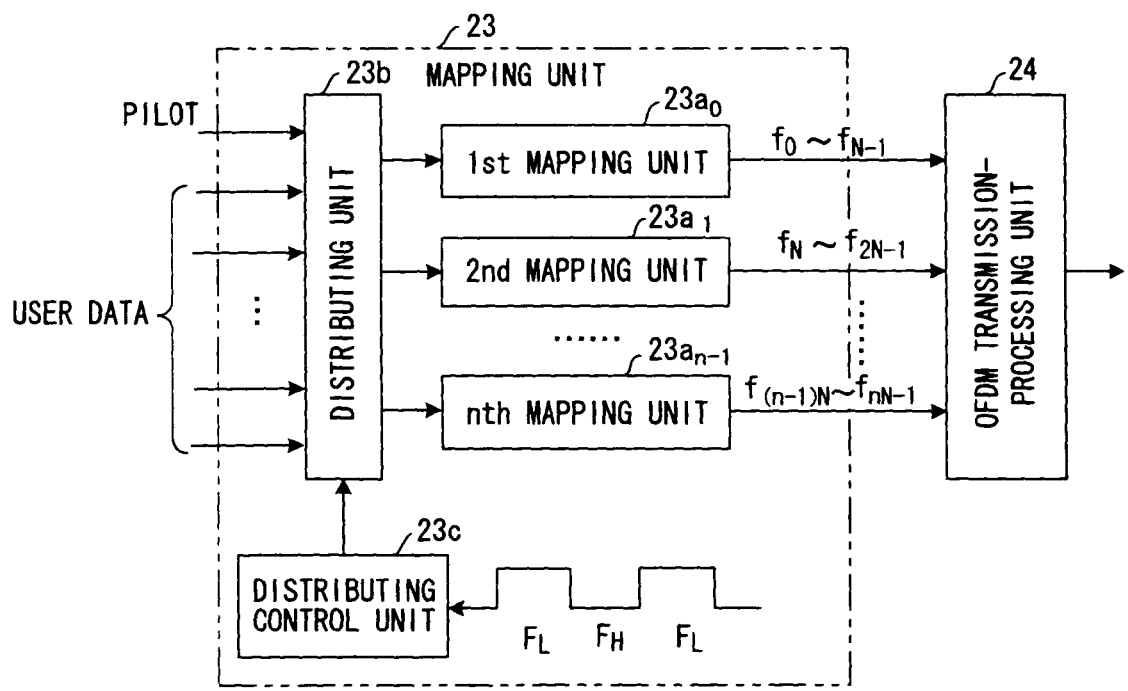
FIG. 8 is another drawing showing construction of a mapping unit that comprises a frequency-division multiplexing function.

FIG. 8 is another drawing showing the construction of a mapping unit having a frequency-division multiplexing function. The mapping unit 23 comprises first to nth mapping units 23$_{a0}$ to 23$_{an-1}$ that map data for each terminal in sub carriers of n number of sub-carrier groups $F_0$ to $F_{n-1}$ (see FIG. 4), a distributing unit 23b that distributes data for each of the mobile stations to the first to nth mapping units 23$_{a0}$ to 23$_{an-1}$, and a distributing-control unit 23c that controls the distributing of data. When the timing is for a high-speed frame $F_H$, the distributing-control unit 23c controls the distributing unit 23b to distributes data and pilots for high-speed mobile stations to the first to nth mapping units 23$_{a0}$ to 23$_{an-1}$, and each of the mapping units 23$_{a0}$ to 23$_{an-1}$ maps the input data and pilots for a high-speed mobile station in a specified sub carrier and inputs it to the OFDM-transmission-processing unit 24. Also, when the timing is for a low-speed frame $F_L$, the distributing-control unit 23c controls the distributing unit 23b to distributes data and pilots for low-speed mobile stations to the first to nth mapping units 23$_{a0}$ to 23$_{an-1}$, and each of the mapping units 23$_{a0}$ to 23$_{an-1}$ maps the input data and pilots for a low-speed mobile station in a specified sub carrier and inputs it to the OFDM-transmission-processing unit 24.

Figure 9:
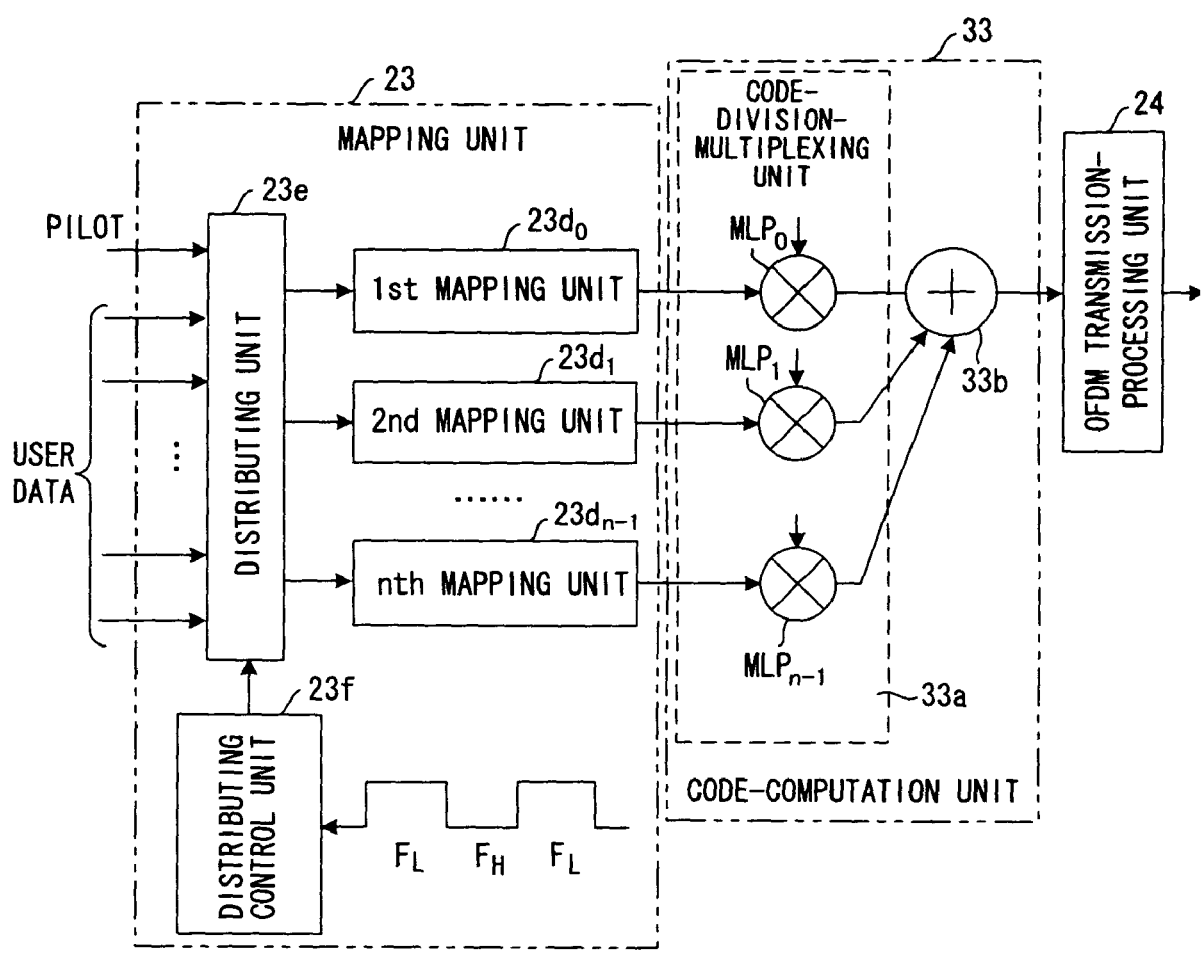
FIG. 9 is a drawing showing construction comprising a code-division multiplexing function.

FIG. 9 shows construction comprising a code-division multiplexing function, where a code-division-multiplexing unit 33 is located between the mapping unit 23 and OFDM-transmission-processing unit 24. The mapping unit 23 comprises first to nth mapping units 23$_{d0}$ to 23$_{dn-1}$ that map transmission data for mobile stations in all of the sub carriers $f_0$ to $f_{nN-1}$, a distributing unit 23e that sorts the data for each of the mobile stations to the first to nth mapping units 23$_{d0}$ to 23$_{dn-1}$ and a distributing-control unit 23f that controls the sorting of data. When the timing is for a high-speed frame $F_H$, the distributing-control unit 23f controls the distributing unit 23e to distributes the data and pilots for high-speed mobile stations to the first to nth mapping units 23$_{d0}$ to 23$_{dn-1}$, and each of the mapping units 23$_{d0}$ to 23$_{dn-1}$ maps the input data and pilots for a high-speed mobile station in sub carriers $f_0$ to $f_{nN-1}$, and inputs it to the code-multiplication unit 33a of the code-multiplexing unit 33. Also, when the timing is for a low-speed frame $F_L$, the distributing-control unit 23f controls the distributing unit 23e to distributes the data and pilots for low-speed mobile stations to the first to nth mapping units 23$_{d0}$ to 23$_{dn-1}$, and each of the mapping units 23$_{d0}$ to 23$_{dn-1}$ maps the input data and pilots for a low-speed mobile station in sub carriers $f_0$ to $f_{nN-1}$, and inputs them to the code-multiplication unit 33a of the code-multiplexing unit 33. Each multiplier $MLP_0$ to $MLP_{n-1}$ of the code-multiplication unit 33a multiplies the sub-carrier samples output from the mapping units 23$_{d0}$ to 23$_{dn-1}$ by a diffusion code unique to a user, and the combining unit 33b, combines the output from each of the multipliers (code-division multiplexing) and inputs the result to the OFDM-transmission-processing unit 24.

As described above, with this first embodiment, the number of pilot symbols is increased in frames $F_H$ used by mobile stations moving at high speed, and the interval between pilot symbols becomes narrow, so the precision for measuring the pilot receiving power and the precision for channel estimation is improved even when the mobile station is moving at high speed. Therefore, the communication quality is improved, and the number of re-transmissions is reduced due to the improvement of communication quality. On the other hand, the interval between pilot symbols is long in frames $F_L$ used by mobile stations moving at low speed, so high-speed data transmission is possible. From the above, it is possible to maintain overall communication quality regardless of the speed that a terminal is moving at, and thus it is possible to prevent a drop in actual transmission speed and to improve the throughput of the base station.

Figure 10:
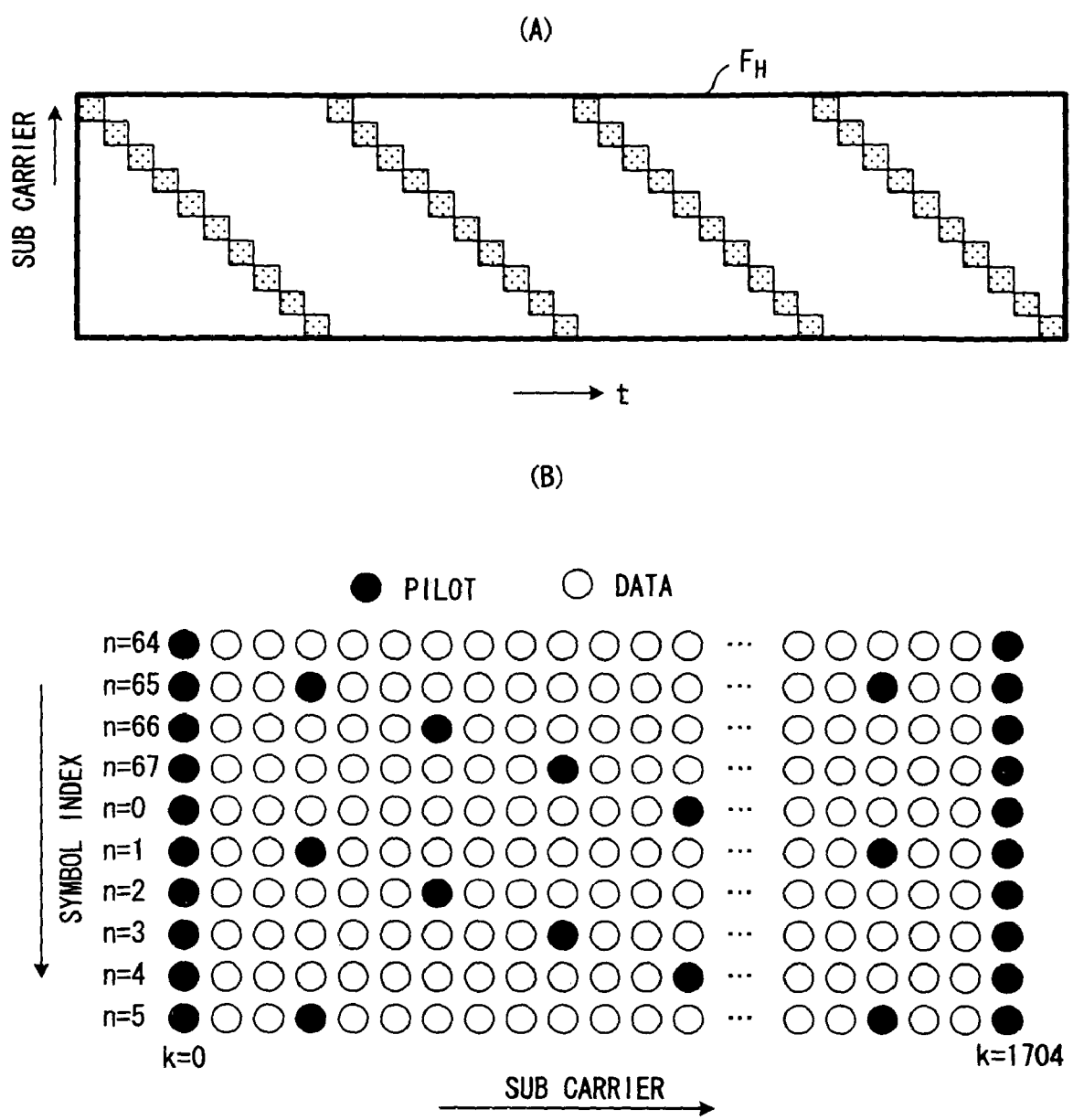
FIG. 10 shows the case when the positions of pilot symbols in the frequency direction have shifted in the time direction.

In the explanation above, the position in the frequency direction of common pilot symbols in a high-speed frame $F_H$ is fixed for a certain time, however as shown in (A) of FIG. 10, it is possible for the position in the frequency direction of pilot symbols to shift in the time direction. Furthermore, as shown in (B) of FIG. 10, common pilot symbols can be separated and be arranged as scattered pilots.

Also, in the explanation above, the used frames were set based on the speed of movement of the mobile stations, however, it is also possible to use receiving quality (CIR, SIR, etc.) instead of movement speed. This is because when the movement speed is fast, the receiving quality becomes poor, and when the movement speed is slow, the receiving quality becomes good. This is the same in other embodiments as well.

(B) Embodiment 2

In the first embodiment, each of the mobile stations UEi measures its speed of movement and notifies the base station BTS of that speed, then based on the speed of movement, the base station determines the frame to be used by the mobile station and sets that frame for the mobile station. In a second embodiment, the mobile station sets the frame to be used itself.

Figure 11:
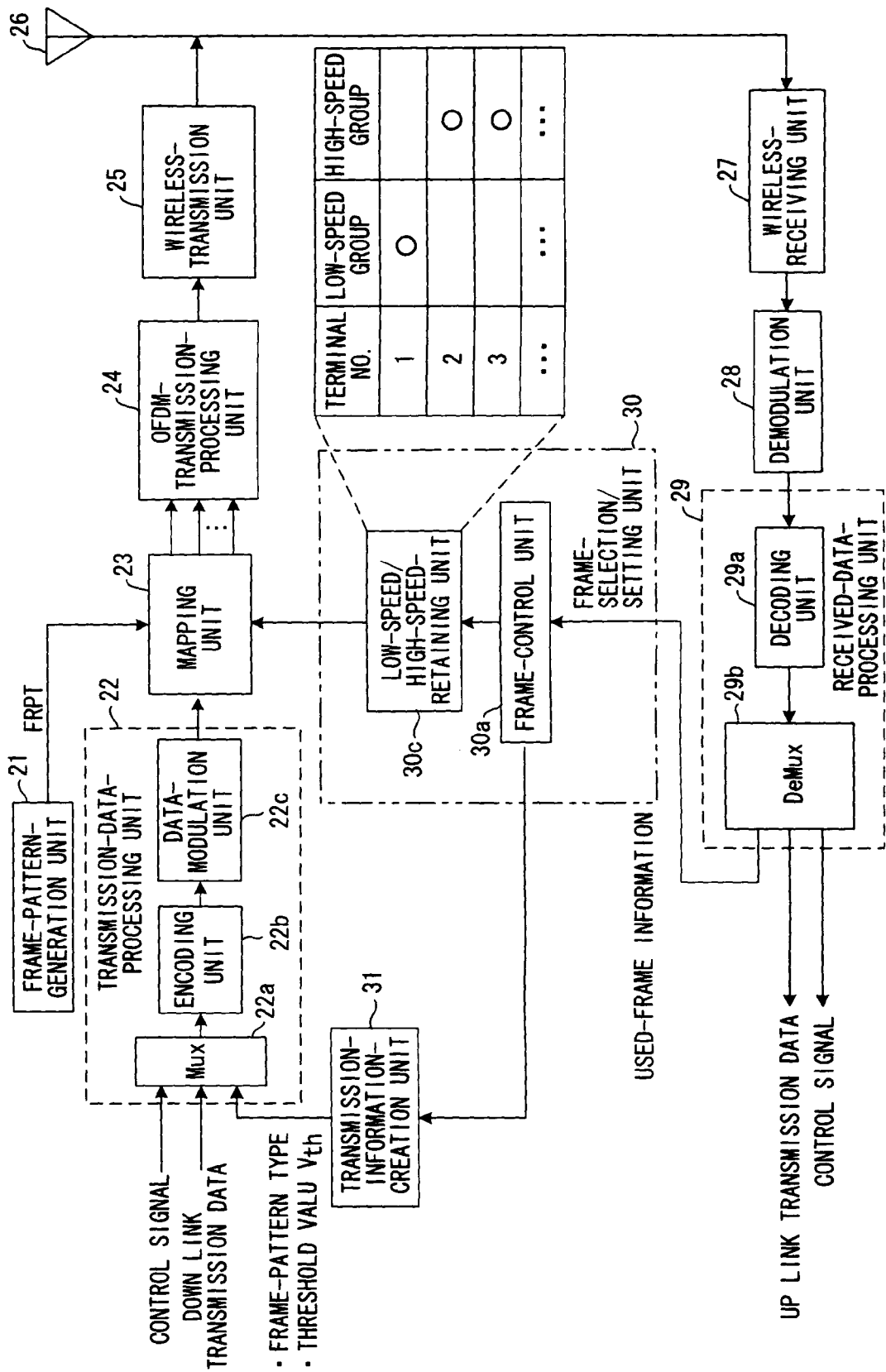
FIG. 11 is a drawing showing the construction of a base station BTS of a second embodiment.

FIG. 11 is a drawing showing the construction of a base station BTS of a second embodiment, where the same reference numbers are used for parts that are identical with those of the base station in the first embodiment shown in FIG. 5. The differing points are: 1) the frame pattern type and the threshold value for identifying high-speed/low-speed are sent to the mobile stations from the base station; and 2) the frame-selection/setting unit 30 does not set frames for mobile stations based on the speed of movement, but receives the frame to be used by a mobile station from that mobile station, and groups the terminals.

The frame-control unit 30a of the frame-selection/setting unit 30 controls the transmission-information-processing unit 31 beforehand to send the frame-pattern type and threshold value Vth for identifying high speed/low speed to each mobile station via the transmission-data-processing unit 22. As shown in FIG. 3, the frame pattern FRPT has one high-speed frame $F_H$ and one low-speed frame $F_L$. Also, the frame-control unit 30a receives information from a mobile station about the frame $F_H$, $F_L$ to be used by that station, and based on that frame information, identifies whether the mobile station is moving at high speed or low speed, and saves that in the low-speed/high-speed-retaining unit 30c.

Figure 12:
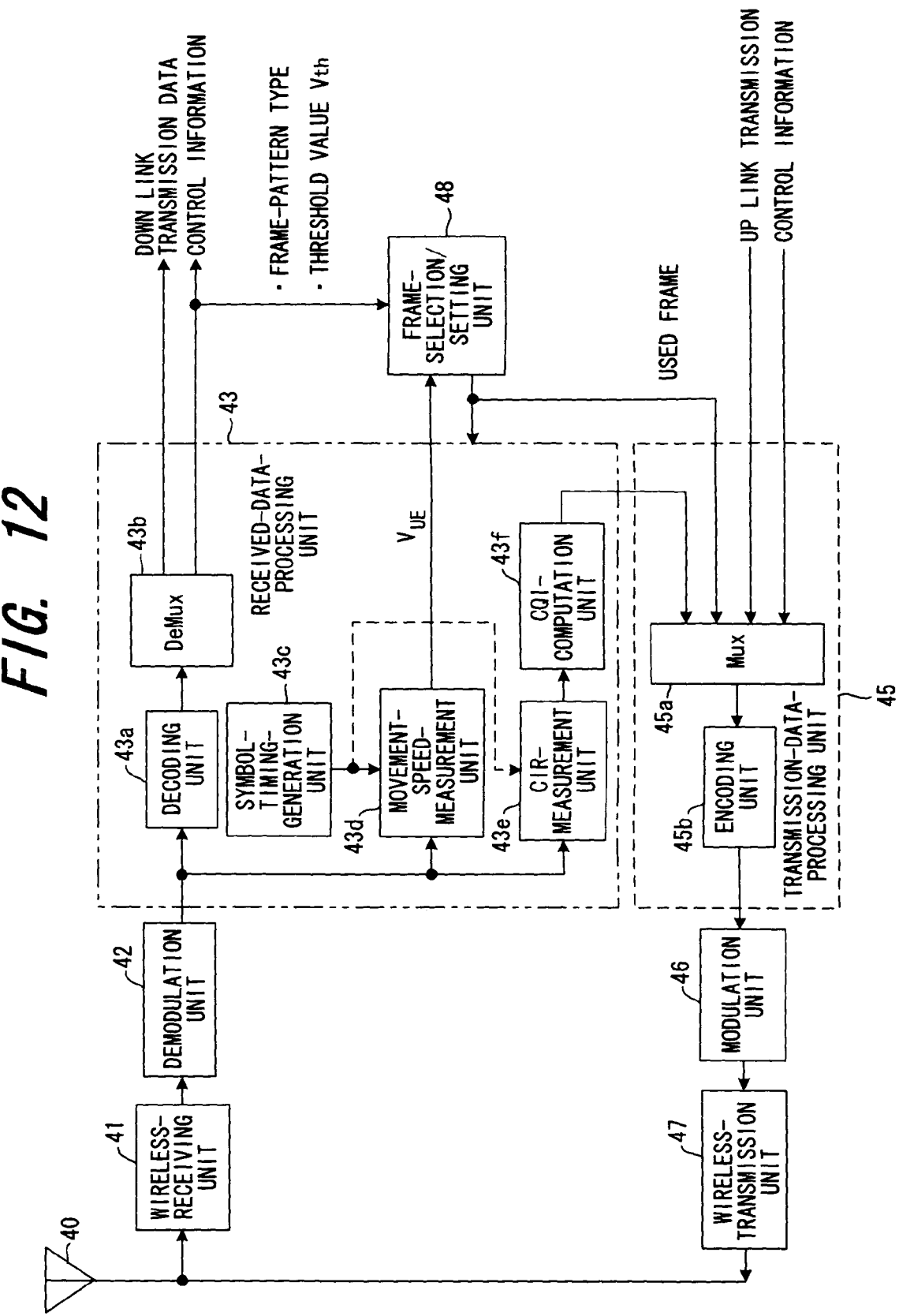
FIG. 12 is a drawing showing the construction of a mobile station of a second embodiment.

FIG. 12 is a drawing showing the construction of a mobile station UEi in the second embodiment, where the same reference numbers are used for parts that are identical with those of the mobile station in the first embodiment shown in FIG. 6. The differing points are: 1) a frame-selection/setting unit 48 is used instead of a used-frame-control unit 44; and 2) the frame-selection/setting unit 48 determines, based on the movement speed $V_{UE}$ of its own station and the threshold value Vth, whether to use a high-speed frame $F_H$ or a low-speed frame $F_L$, and notifies the base station BTS.

Figure 13:
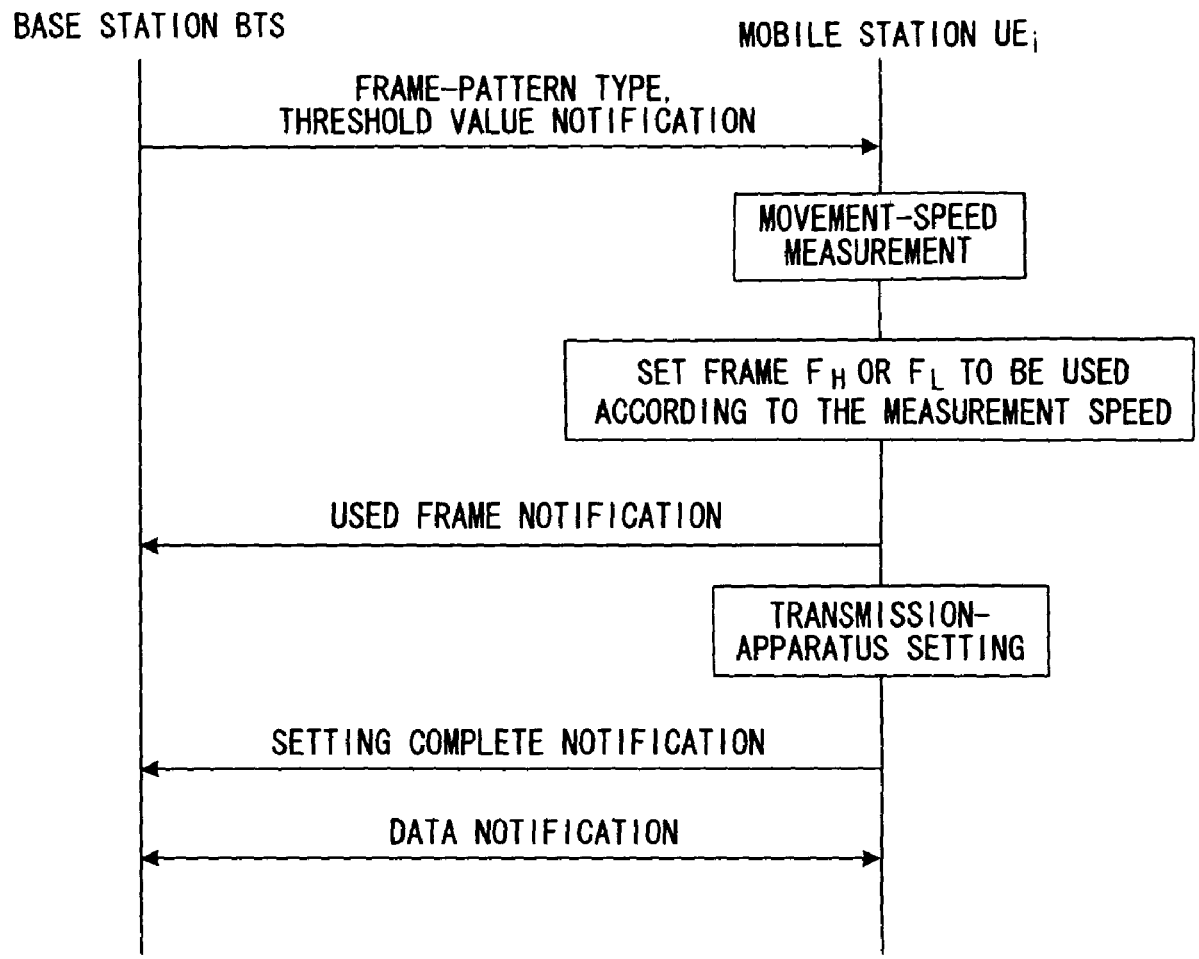
FIG. 13 is a drawing explaining the frame setting sequence for a mobile station UEi.

FIG. 13 is a drawing explaining the frame-setting sequence in the mobile stations UEi.

The wireless base station BTS transmits beforehand the types of frame-patterns FRPT and a threshold value Vth for identifying high speed/low speed to each of the mobile stations UEi, and the mobile stations store the received data. The mobile stations UEi periodically measure their own speed of movement $V_{UE}$, then compare that speed of movement $V_{UE}$ with the threshold vale Vth that was sent beforehand, and based on the size determine whether they are moving at high speed or low speed. Moreover, based on the judgment results, the mobile stations UEi set whether to use a high-speed frame $F_H$ or a low-speed frame $F_L$, and notify the base station BTS, then sets the frame in the transmission unit, and when setting is finished, notifies the base station that setting is finished.

After that, the base station BTS multiplexes user data in the frame $F_H$ or $F_L$ according to the destination mobile station, and sends the data, and each of the mobile stations UEi uses the frame $F_H$ or $F_L$ that was set in the aforementioned sequence to perform communication. Moreover, at the same time as performing data communication, the mobile stations UEi use the pilots in their own frame $F_H$ or $F_L$ to perform measurement of the receiving power or to estimate the channel. With this second embodiment, it is possible to obtain the same effect as in the first embodiment.

(C) Embodiment 3

In a third embodiment of the invention, the mobile stations are grouped into those for high-speed frames $F_H$ and those for low-speed frames $F_L$ of the frame pattern FRPT, and at the timing for high-speed frames, the transmission scheduling process for the high-speed mobile station group is performed based on CQI (Channel Quality Indication), and at timing for low-speed frames, the transmission scheduling process for the low-speed mobile station group is performed based on CQI. In other words, in this third embodiment, the scheduling process is performed in accordance to the frame timing.

Figure 14:
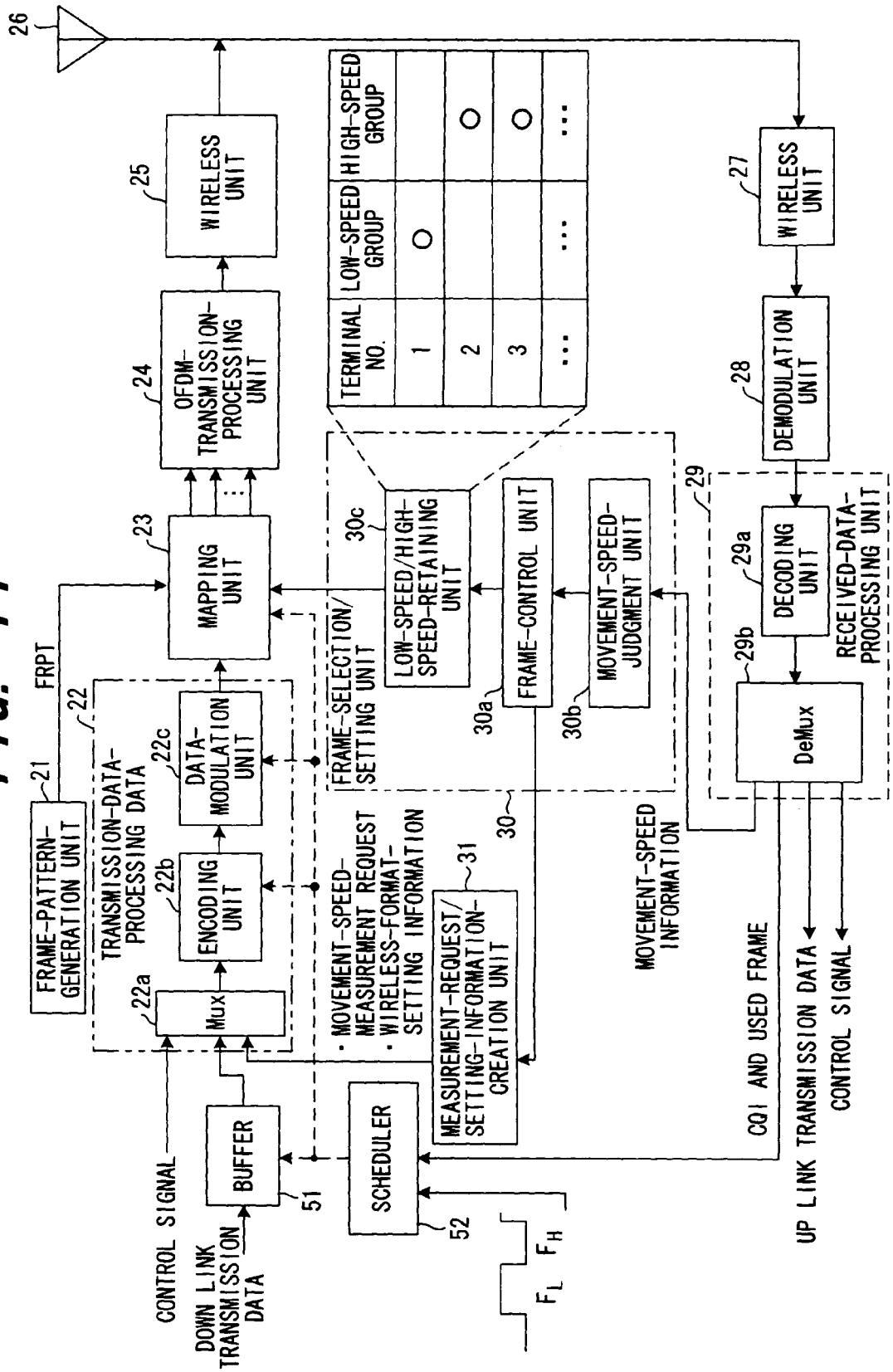
FIG. 14 is a drawing showing the construction of a base station BTS of a third embodiment.

FIG. 14 is a drawing showing the construction of a base station BTS in this third embodiment, where the same reference numbers are used for parts that are identical with those of the base station in the first embodiment shown in FIG. 5. The differing points are: 1) there is a buffer 51 that stores down link transmission data for each of the mobile stations; 2) there is a scheduler 52 that at high-speed frame timing, performs the transmission scheduling process for the high-speed mobile station group based on CQI from each mobile station, and at low-speed frame timing, performs the transmission scheduling process for the low-speed mobile station group based on CQI from each mobile station; and 3) the scheduler 52 comprises a CQI table as shown in FIG. 15, and performs scheduling by setting the transport block size (number of bits) TBS, number of multi codes (in the case of code-division multiplexing), and modulation type from that table according to the CQI.

Figure 16:
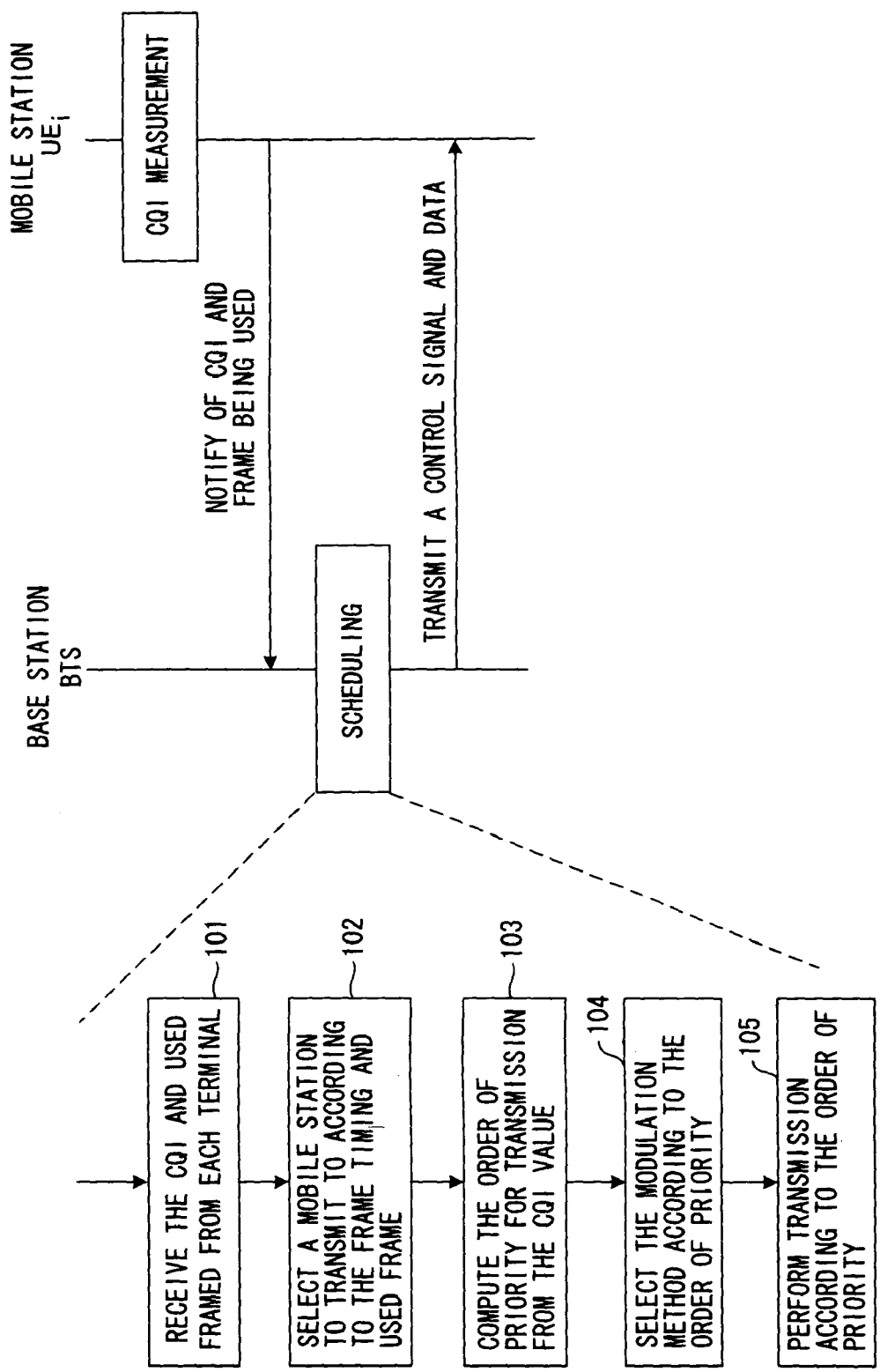
FIG. 16 is a drawing explaining the scheduling process for a base station.

FIG. 16 is a drawing explaining the scheduling process by the base station.

Each mobile station UEi periodically computes the CQI, and notifies the base station BTS of that CQI and the frame type (high-speed frame $F_H$, or low-speed frame $F_L$) currently used by the mobile station. The base station BTS receives the CQI and used frame from each of the mobile stations UEi, and performs scheduling, and based on that scheduling, transmits a control signal and down link data to each of the mobile stations.

When performing scheduling, the scheduler 52 receives the CQI and currently used frame from each mobile station UEi (step 101), and when the timing is for high-speed frames $F_H$, selects the mobile-station group using high-speed frames, and when the timing is for low-speed frames $F_L$, selects the mobile-station group using low-speed frames (step 102). Next, based on the CQI values of the selected mobile stations, the scheduler 52 sets the order of priority for transmitting data according to the priority of the mobile stations (step 103). The larger the CQI number, the higher the priority is.

After the order of priority has been set, based on the CQI, the scheduler 52 selects the modulation method, encoding rate and number of data used during transmission to each of the mobile stations (step 104), and according to the order of priority, selects transmission data that is stored in the buffer 51 for each of the mobile stations, performs frequency-division multiplexing in that frame and transmits the data (step 105). After that, it repeats the process described above to transmit data in the order of highest priority, alternating between the high-speed mobile terminal group and low-speed mobile terminal group.

In step 104, control information for the selected modulation method and encoding rate can be sent at the same time as the transmission data, or the transmission data can be sent after first sending this control information.

With this third embodiment, at the timing for a high-speed frame, the transmission scheduling process for the high-speed mobile station group can be performed based on the CIR received from each mobile station, and at the timing for a low-speed frame, the transmission scheduling process for the low-speed mobile station group can be similarly performed based on the CIR.

(D) Embodiment 4

Figure 17:
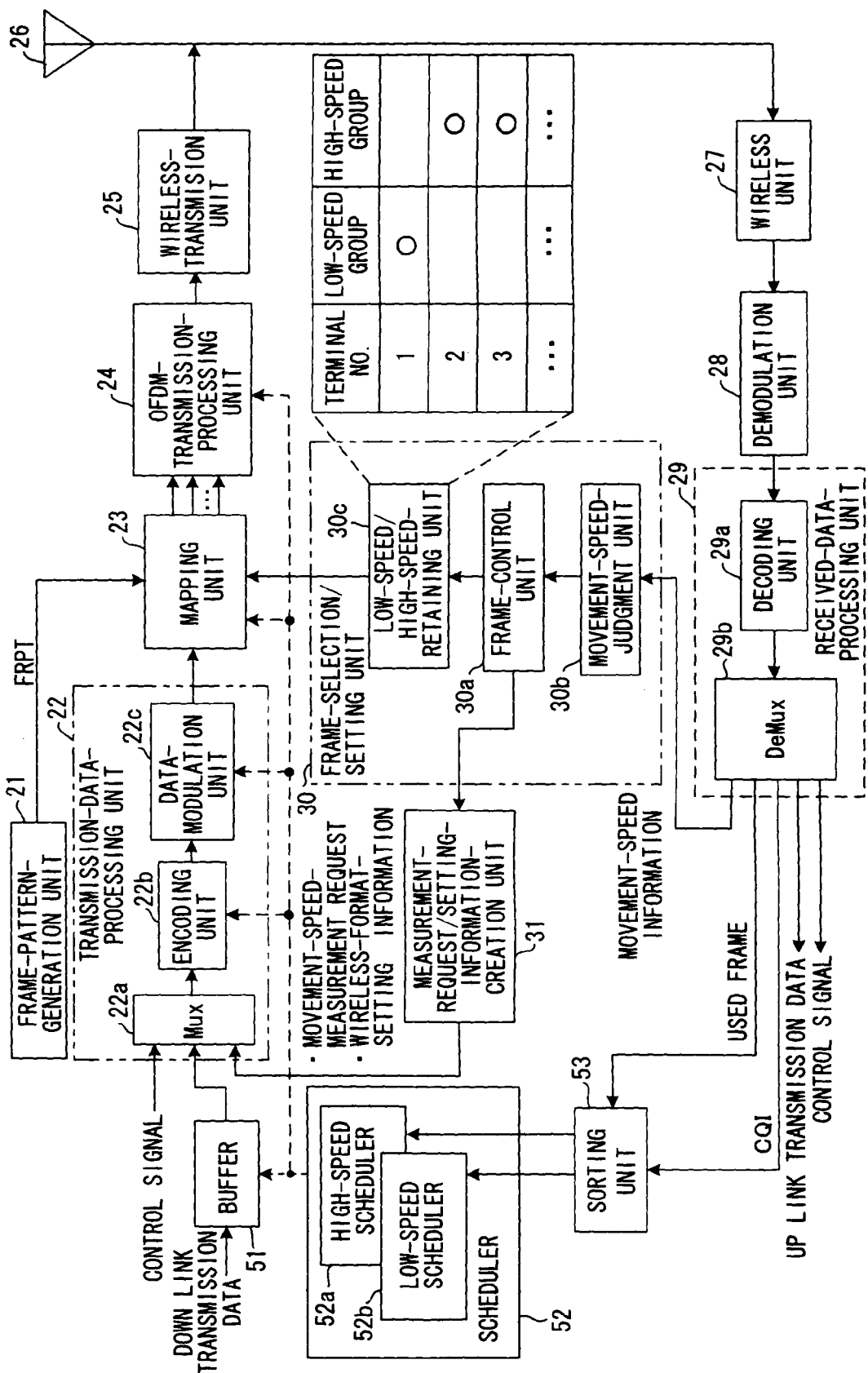
FIG. 17 is a drawing showing the construction of a base station BTS of a fourth embodiment.

FIG. 17 is a drawing showing the construction of a base station BTS in a fourth embodiment. In the third embodiment, one scheduler performed the transmission scheduling process for the high-speed mobile station group at timing for a high-speed frame, and performed the transmission scheduling process for the low-speed mobile station group at timing for a low-speed frame, however, in this fourth embodiment there is a high-speed scheduler 52a and a low-speed scheduler 52b that function as the scheduler, and there is a sorting unit 53.

Figure 18:
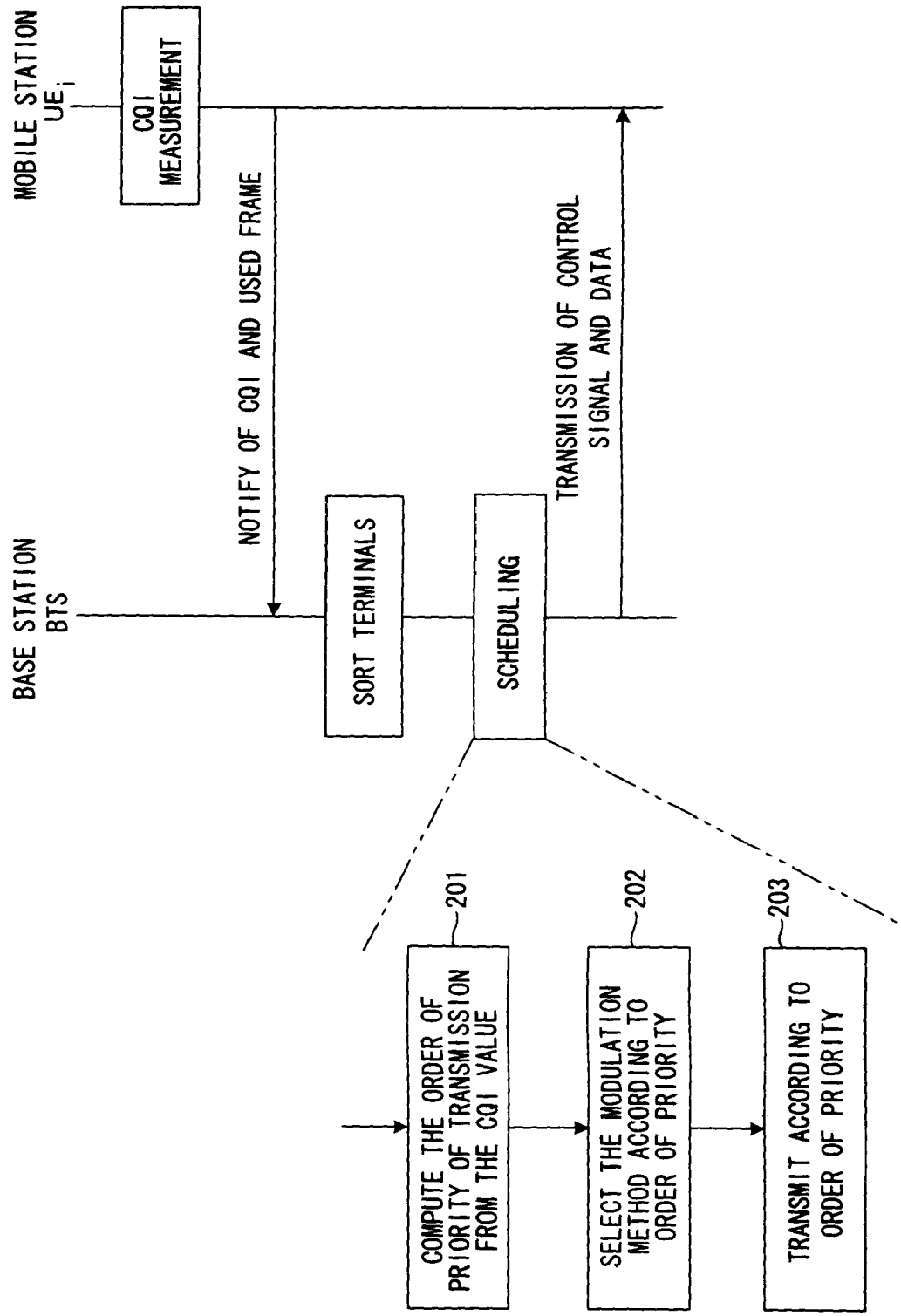
FIG. 18 is a drawing explaining the scheduling process of the base station BTS of a fourth embodiment.

FIG. 18 is a drawing explaining the scheduling process by the base station of this fourth embodiment.

Each of the mobile stations UEi periodically compute the CQI, and notifies the base station BTS of that CQI and the type of frame (high-speed frame $F_H$ or low-speed frame $F_L$) currently used by the mobile station. The base station BTS receives the CQI and used frames from each of the mobile stations, and sorts the mobile stations into a high-speed group and a low-speed group, and performs scheduling for each respective group, then based on that scheduling, transmits control signals and down link data to each of the mobile stations.

In other words, based on the CQI and type of frame (high-speed frame $F_H$ or low-speed frame $F_L$) currently being used, the sorting unit 53 divides the mobile stations into groups, and sends the CQI from the mobile stations using high-speed frames $F_H$, together with a mobile-station-ID number, to the high-speed scheduler 52a, and sends the CQI from the mobile stations using low-speed frames $F_L$, together with a mobile-station-ID number, to the low-speed scheduler 52b.

The high-speed scheduler 52a performs the transmission scheduling process for the high-speed mobile station group at timing for high-speed frames $F_H$ using a process similar that that of the third embodiment, and the low-speed scheduler 52b performs the transmission scheduling process for the low-speed mobile station group at timing for low-speed frames $F_L$.

In other words, based on the CQI values from the high-speed mobile stations, the high-speed scheduler 52a sets the order of priority for transmitting data to mobile stations according to the priority of the mobile stations, and based on the CQI values from the low-speed mobile stations, the low-speed scheduler 52b sets the order of priority for transmitting data to mobile stations according to the priority of the mobile stations (step 201). After the order of priority has been completely set, based on the respective CQI, the high-speed scheduler 52a and the low-speed scheduler 52b select the modulation method, encoding rate and number of data to be used in transmission to each of the mobile stations according to a CQI table (step 202). Next, at timing for a high-speed frame, the high-speed scheduler 52a selects transmission data that is stored in the buffer 51 for each of the high-speed mobile stations according to the order of priority, then performs frequency-division multiplexing and transmits the data. Moreover, at timing for a low-speed frame, the low-speed scheduler 52b selects transmission data that is stored in the buffer 51 for each of the low-speed mobile stations according to the order of priority, then performs frequency-division multiplexing and transmits the data (step 203).

With this fourth embodiment, as in the first embodiment, at timing for high-speed frames, the transmission scheduling process for the high-speed mobile station group can be performed based on the CIR, and at timing for low-speed frames, the transmission scheduling process for the low-speed mobile station group can be performed based on the CIR. Also, with this fourth embodiment, scheduling is performed using two schedulers, so it becomes possible to take time in performing scheduling.

(E) Embodiment 5

Figure 19:
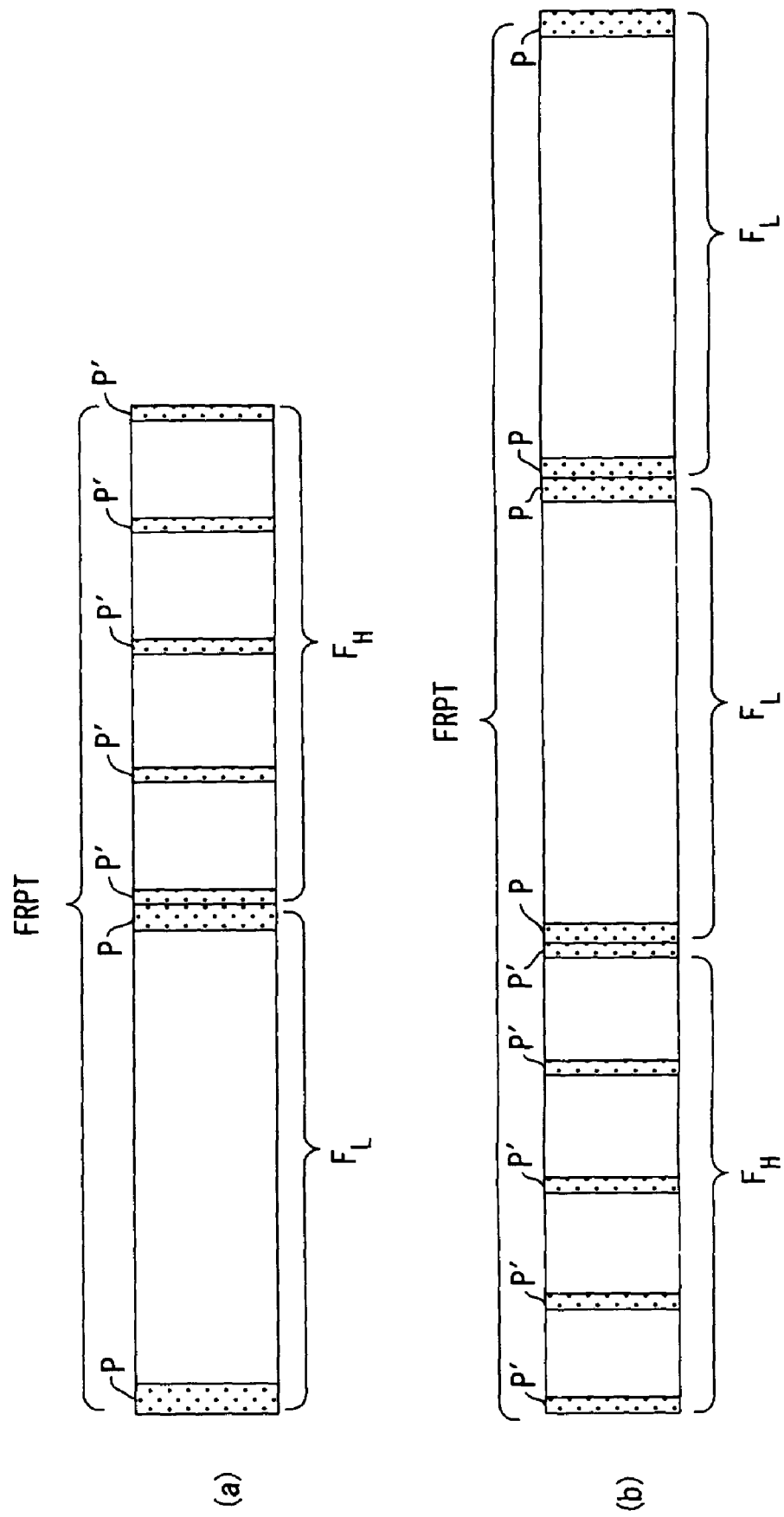
FIG. 19 is a drawing explaining a fifth embodiment that changes the frame pattern FRPT.

In the first embodiment, the ratio of the number of mobile stations moving at low speed to the number of mobile stations moving at high speed is 1:1, so the ratio of the number of low-speed frames $F_L$ to the number of high-speed frames $F_H$ in the frame pattern FRPT is fixed at 1:1 (see (a) of FIG. 19). In the fifth embodiment, as the ratio of the number of mobile stations moving at low speed to the number of mobile stations moving at high speed (hereafter referred to as the low-speed/high-speed ratio) changes dynamically, the ratio of the number of low-speed frames $F_L$ to the number of high-speed frames $F_H$ in the frame pattern FRPT (hereafter referred to as the low-speed/high-speed-frame ratio) is controlled according to the low-speed/high-speed ratio. For example, when the low-speed/high-speed ratio is 2:1, then as shown in (b) of FIG. 19), three frames form one combination, which is transmitted repeatedly. Not changing the low-speed/high-speed-frame ratio based on the low-speed/high-speed ratio could cause the overall throughput of the base station to drop. For example, in the case that the low-speed/high-speed-frame ratio is kept at 1:1 even though the low-speed/high-speed ratio is 2:1, the low-speed mobile stations may not be able to fit in one low-speed frame, which would cause the overall throughput of the base station to drop. Therefore, in this fifth embodiment, as described above, the low-speed/high-speed-frame ratio is changed according to low-speed/high-speed ratio.

Figure 20:
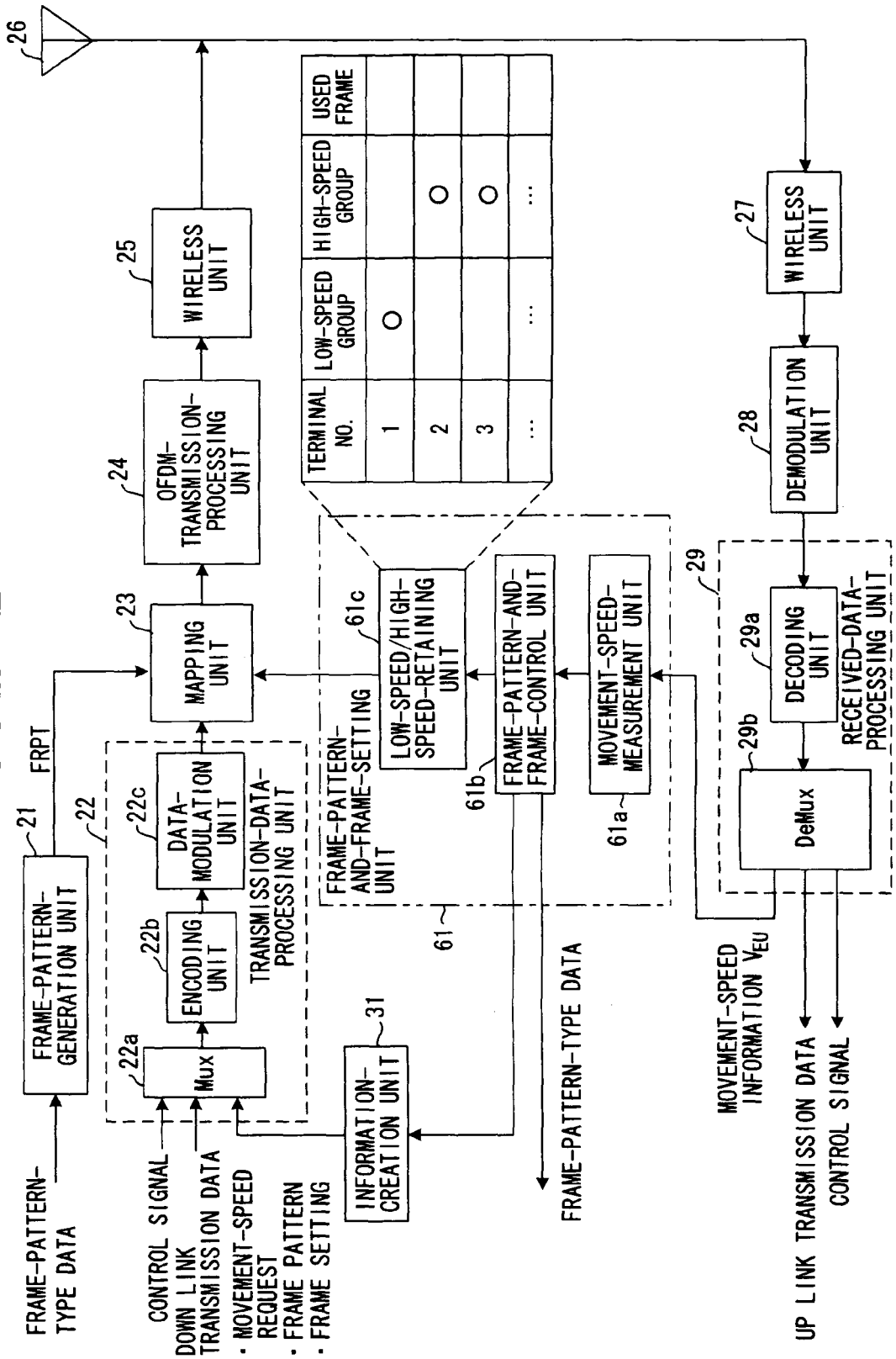
FIG. 20 is a drawing showing the construction of a base station BTS of a fifth embodiment.

FIG. 20 is a drawing showing the construction of a base station in this fifth embodiment, where the same reference numbers are used for parts that are identical with those of the base station in the first embodiment shown in FIG. 5. The points that differ from the first embodiment are: 1) there is a frame-pattern-and-frame-setting unit 61 in the place of the frame-selection/setting unit 30, and 2) the frame-pattern-generation unit 21 generates a specified frame pattern FRPT based on the type of frame pattern set by the frame-pattern-and-frame-setting unit 61.

The frame-pattern-and-frame-setting unit 61 comprises: a movement-speed-judgment unit 61a that compares the speed of movement $V_{UE}$ with the high-speed/low-speed threshold value Vth, and based on that size, determines whether a mobile station is moving at high speed or low speed; a frame-pattern-and-frame-control unit 61b that sets a frame pattern FRPT based on the low-speed/high-speed ratio and the number of mobile stations in a cell that are performing communication, and sets the frame of the frame pattern FRPT to be used by a mobile station; and a low-speed/high-speed-retaining unit 61c that stores for each mobile station whether it is moving at high speed or low speed, and stores the used frame.

Figure 21:
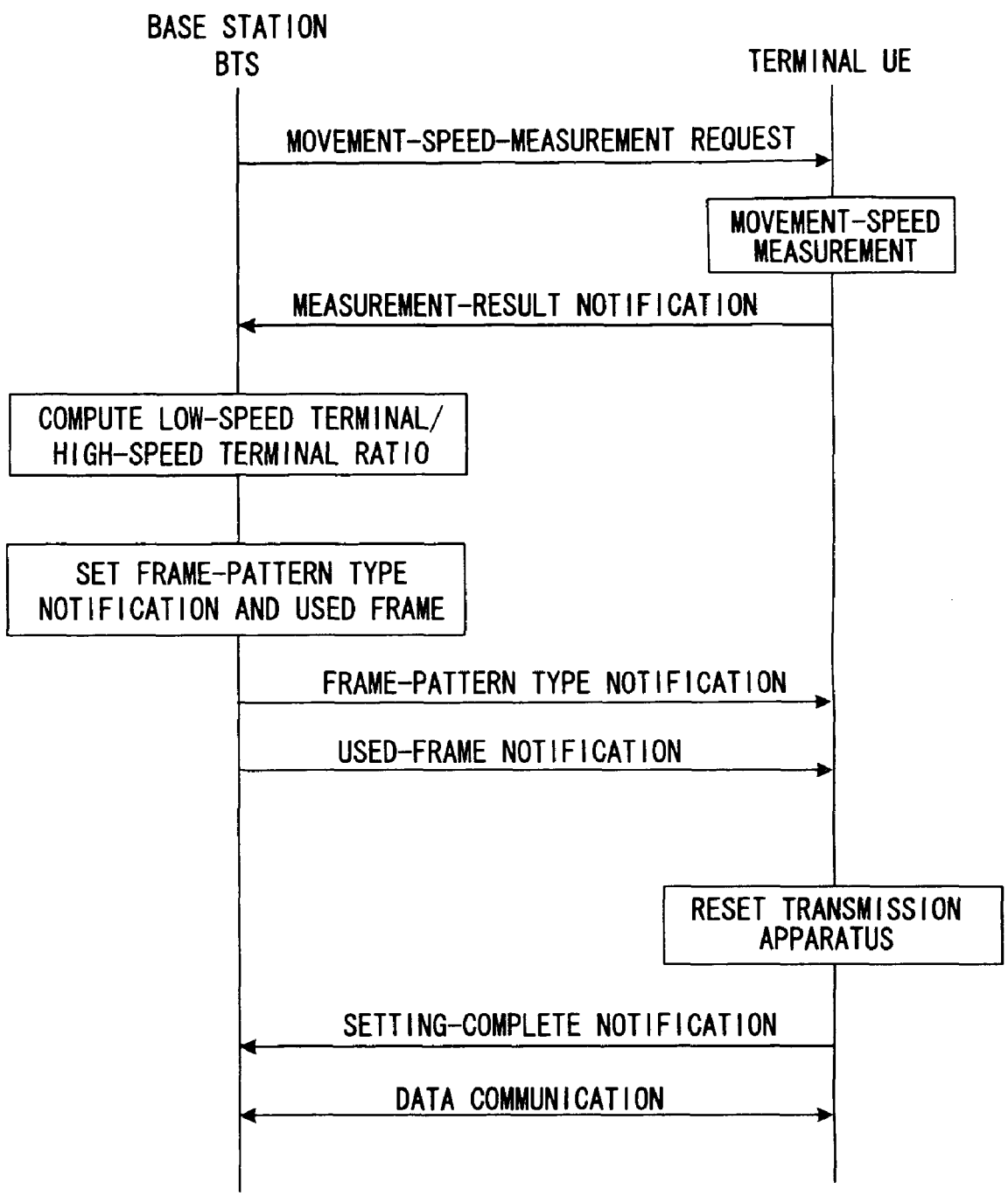
FIG. 21 is a drawing explaining the frame-pattern type and frame setting sequence for a base station BTS.

FIG. 21 is a drawing explaining the frame-pattern type and frame setting sequence of a base station BTS.

The frame-pattern-and-frame-control unit 61b of the base station BTS controls the information-setting unit 31 to send a request to each mobile station UEi (i=1, 2, . . . ) to measure the speed of movement. Each of the mobile stations UEi that received the request measure their respective movement speed $V_{UE1}$ to $V_{UE6}$, and notifies the base station BTS. The frame-pattern-and-frame-control unit 61b compares the movement speed $V_{UEi}$ that is sent from a mobile station with the threshold value Vth and determines whether that mobile station is moving at high speed or low speed, and counts the number of mobile stations in a cell that are performing communication, the number of mobile stations that are moving at high speed and the number of mobile stations that are moving at low speed. After all of the mobile stations in the cell that are performing communication have been identified as either moving at high speed or at low speed, the frame-pattern-and-frame-control unit 61b computes the low-speed/high-speed ratio for the cell, and based on the number of mobile stations in the cell that are performing communication and this low-speed/high-speed ratio, sets the frame-pattern type. For example, when the low-speed/high-speed ratio is 2:1, and there is a large number of mobile stations, the frame-pattern-and-frame-control unit 61b sets the frame pattern shown in (b) of FIG. 19 as the frame pattern FRPT to be used, and sets the frame to be used for each mobile station.

After that, the frame-pattern-and-frame-control unit 61b notifies each of the mobile stations of the set frame-pattern type and the used frame, and then according to instruction from the base station BTS, each of the mobile stations UEi reset that frame pattern and frame in its transmission unit, and after setting is finished, notifies the base station BTS that setting is finished. Notifying a mobile station of the frame pattern and used frame requires changing the setting of the transmission apparatus, so it is performed before the switching timing.

After this, the base station BTS multiplexes the user data in the frames corresponding to the destination mobile stations, and transmits the data, and each of the mobile stations UEi extracts its own data from the frame indicated in the sequence described above.

With the fifth embodiment, it becomes possible to used a suitable frame pattern that is based on the number of mobile stations that are either moving at high speed or low speed, and as a result, the precision of channel estimation is improved as well as the overall throughput of the base station.

(F) Embodiment 6

In the embodiments described above, at least two types of frames in which the number of common pilots in each is different, or at least two types of frames in which the number of distributions of common pilots in each is different, were combined into one combination or more, and data was mapped in each frame and each combination was repeatedly transmitted to mobile terminals. In a sixth embodiment, a plurality of sub carriers is divided into two groups, where the number of common pilots or the number of distributions of common pilots in a frame configured with the first group of sub carriers and in a frame configured with the second group of sub carriers differs, and data is mapped in each of the frames configured with the first and second groups of sub carriers, and repeatedly transmitted to the respective mobile terminals.

Figure 22:
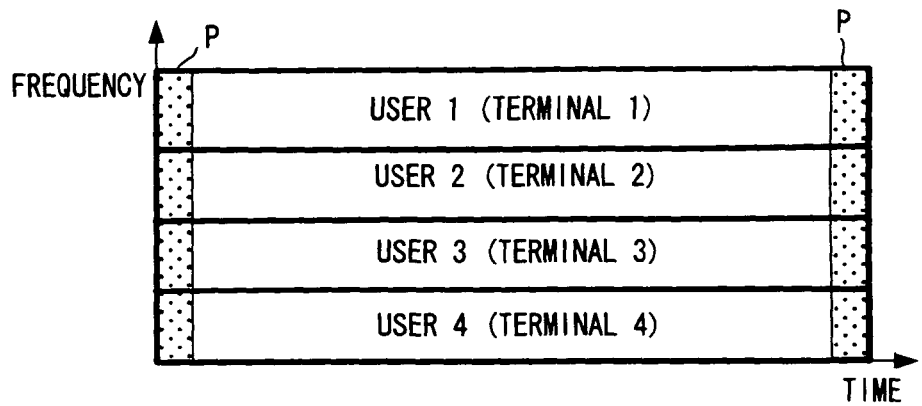
FIG. 22 is a drawing explaining a multiplexing method (Localized OFDMA) that assigns sub carriers and performs frequency-division multiplexing for each user (mobile terminal).
Figure 23:
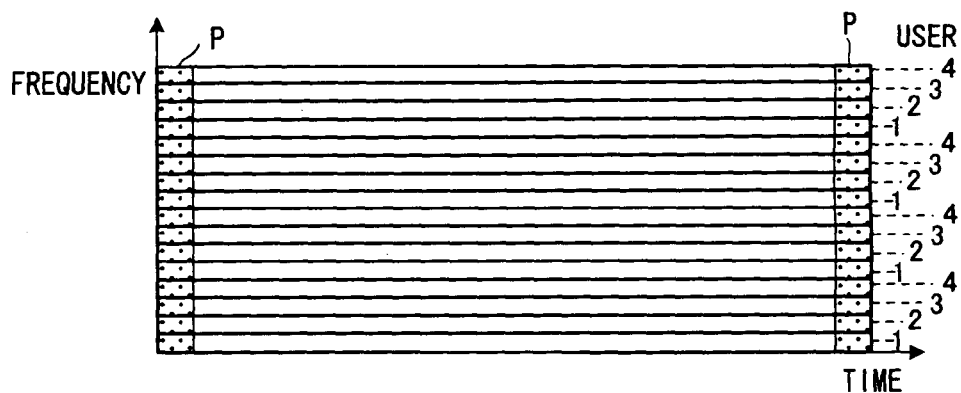
FIG. 23 is a drawing explaining a multiplexing method that sets users for using the respective sub carriers, and performs frequency-division multiplexing.

To perform frequency-division multiplexing in OFDMA (Orthogonal Frequency Division Multiplexing Access), there are two assignment methods as shown in FIGS. 22 and 23. In FIG. 22 continuous sub carriers are assigned to each user (mobile terminal), and in FIG. 23 users are set for and multiplexed in each sub carrier. In FIG. 23, sub carriers to which the same user number is attached are sub carriers assigned to that user, and are used by only that user. The multiplexing method shown in FIG. 22 is called Localized OFDMA, and the multiplexing method shown in FIG. 23 is called Distributed OFDMA. A sixth embodiment will be explained below that uses Localized OFDMA, however, Distributed OFDMA could also be applied to this embodiment.

Figure 24:
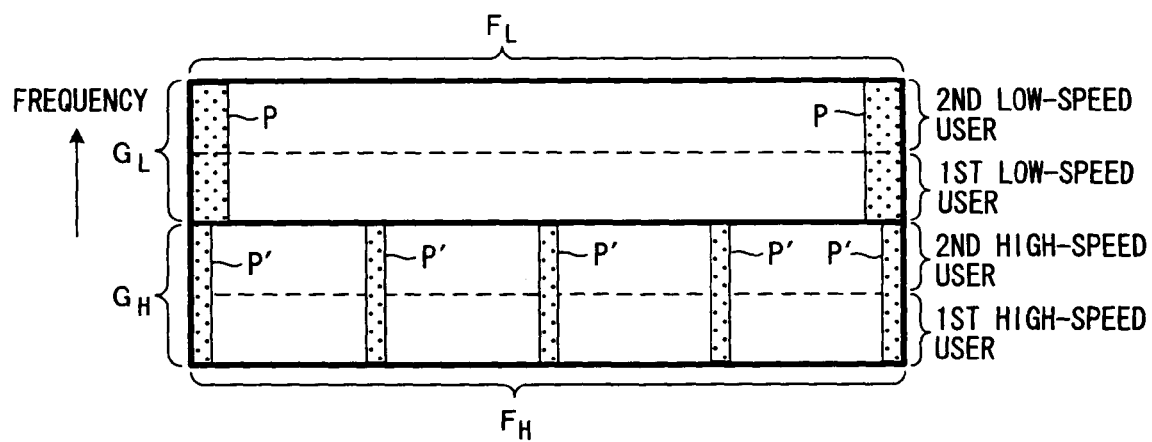
FIG. 24 shows an example of frequency division and the construction of frames when two users are moving at low speed and two users are moving at high speed.

As shown in FIG. 24, in the sixth embodiment, sub carriers are divided into a group $G_H$ for high-speed terminals, and a group $G_L$ for low-speed terminals, and the number of common pilots or the number of distributions of common pilots in a frame $F_H$ configured with sub carriers in the high-speed terminal group $G_H$ and in a frame $F_L$ configured with sub carriers in the low-speed terminal group $G_L$ is different from each other. In other words, in this sixth embodiment, there is a large number of common pilots or a large number of distributions of common pilots in a frame $F_H$ configured with high-speed terminal sub carriers, and there is a small number of common pilots or a small number of distributions of common pilots in a frame $F_L$ configured with low-speed terminal sub carriers.

FIG. 24 shows the case in which frequency-division multiplexing is performed for four users, where two users are moving at low speed, and the remaining two users are moving at high speed, and the sub carriers used in OFDM are divided into two groups $G_H$, $G_L$, where the sub carriers in the high-speed terminal group $G_H$ are assigned to the first and second high-speed users, and the sub carriers in the low-speed terminal group $G_L$ are assigned to the first and second low-speed users. In this case, the frequency of the high-speed group $G_H$ is low frequency, and the frequency of the low-speed group $G_L$ is high frequency, however, the opposite is also possible. Also, in FIG. 24, the pilots are arranged in all of the sub carriers, in other words, they are arranged continuously in the frequency direction, however, the pilots could also be arranged at set or unset intervals.

Figure 25:
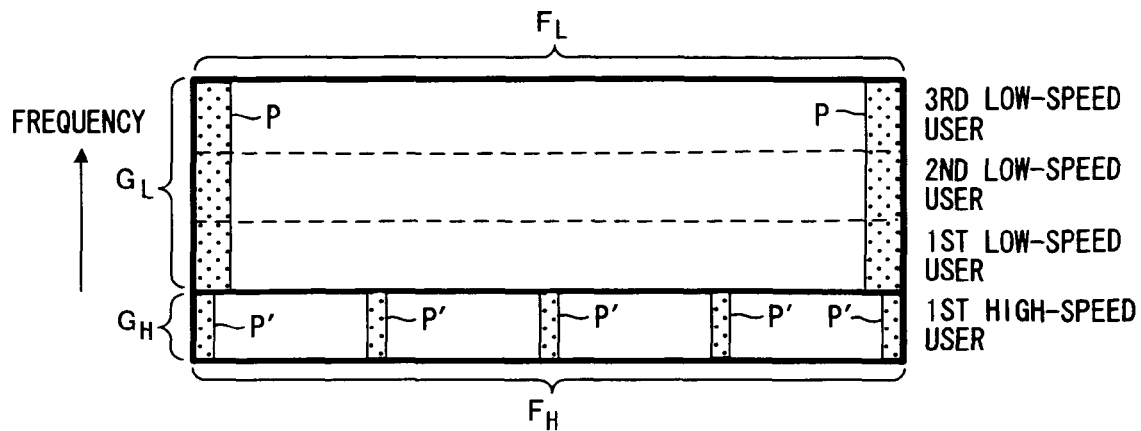
FIG. 25 shows an example of frequency division and the construction of frames when the ratio of terminals moving at low speed with respect to terminals moving at high speed is 3:1.

FIG. 25 shows an example of the frequency divisions and frame configuration for the case in which the ratio of the number of terminals moving a low speed to the number of terminals moving at high speed is 3:1.

Figure 26:
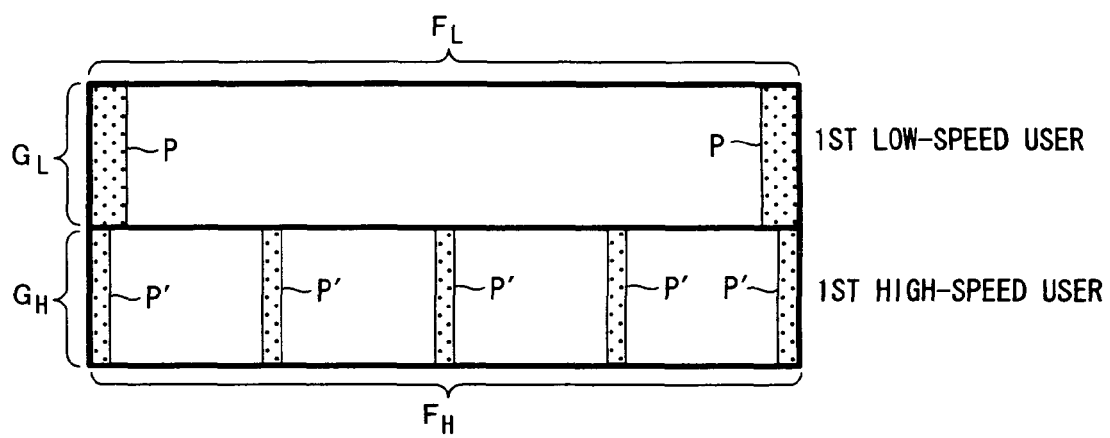
FIG. 26 shows an example of frequency division and the construction of frames when frequency-division multiplexing is performed and data is transmitted for one terminal that is moving at low speed and one terminal that is moving at high speed.

FIG. 26 shows an example of the frequency divisions and frame configuration for the case in which frequency-division multiplexing is performed for data for one terminal moving at low speed and for one terminal moving at high speed, and then the data is transmitted.

Figure 27:
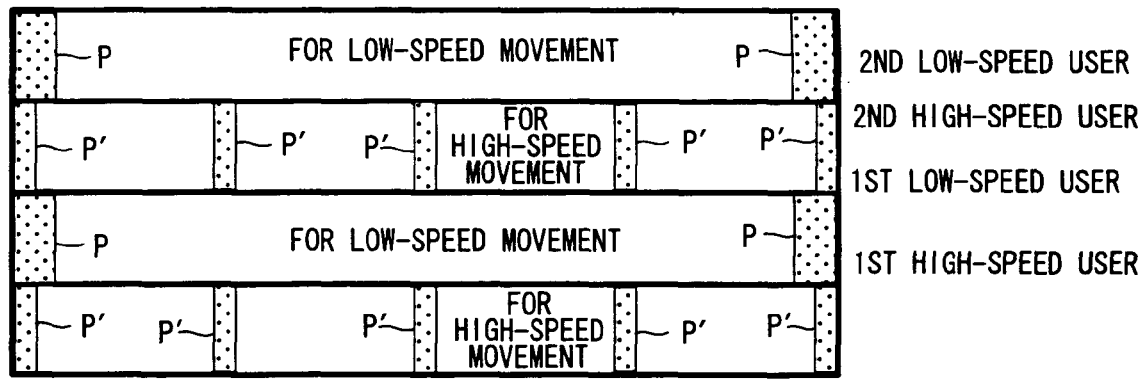
FIG. 27 shows an example of frequency division and the construction of frames when sub carriers for low-speed movement, and sub carriers for high-speed movement are distributed.

FIG. 27 shows an example of the frequency divisions and frame configuration for the case in which low-speed sub carriers and high-speed sub carriers are divided, and sub carriers are assigned alternately to high-speed users and low-speed users.

Figure 28:
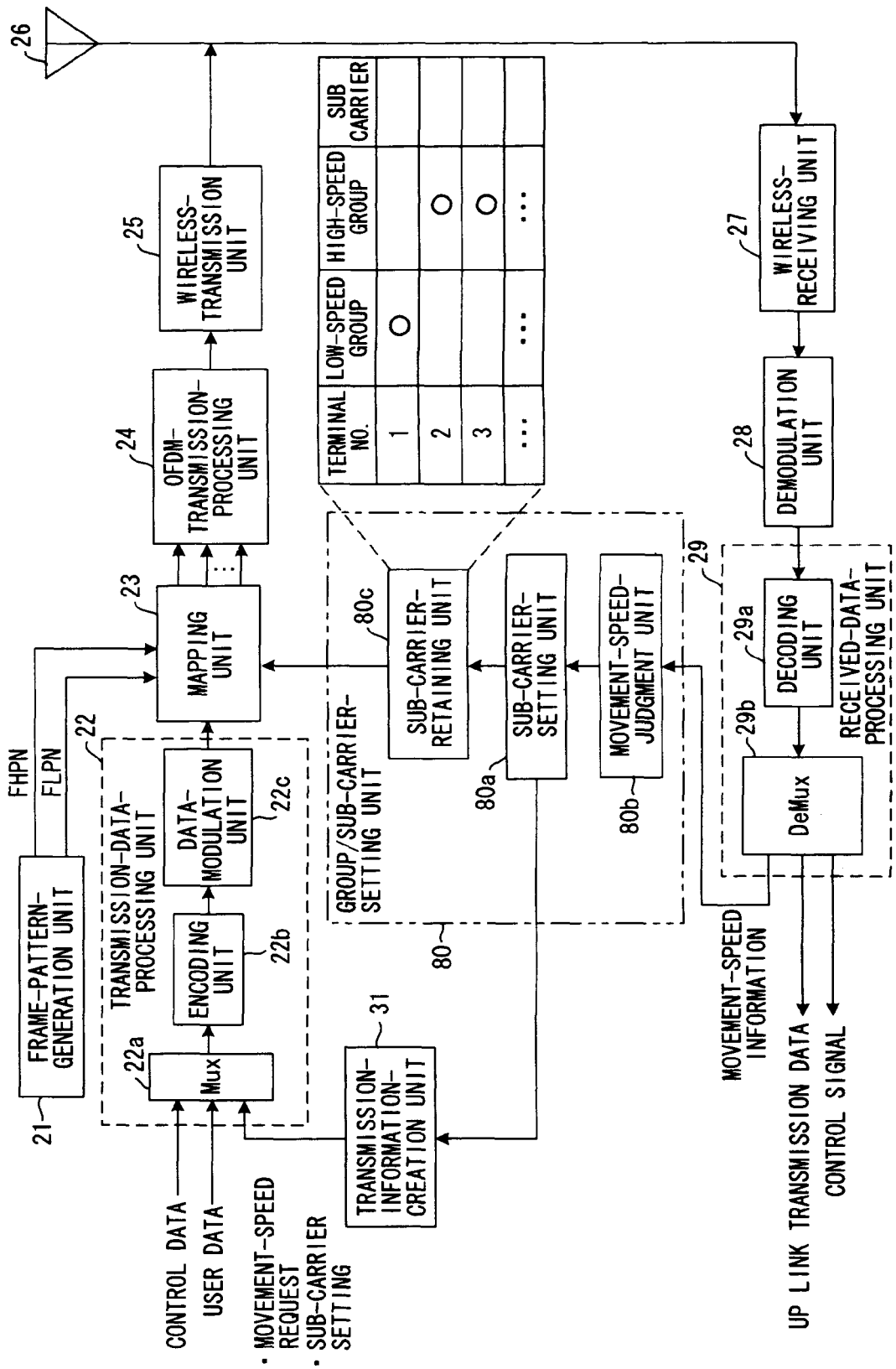
FIG. 28 is a drawing showing the construction of a base station BTS of a sixth embodiment.
Figure 29:
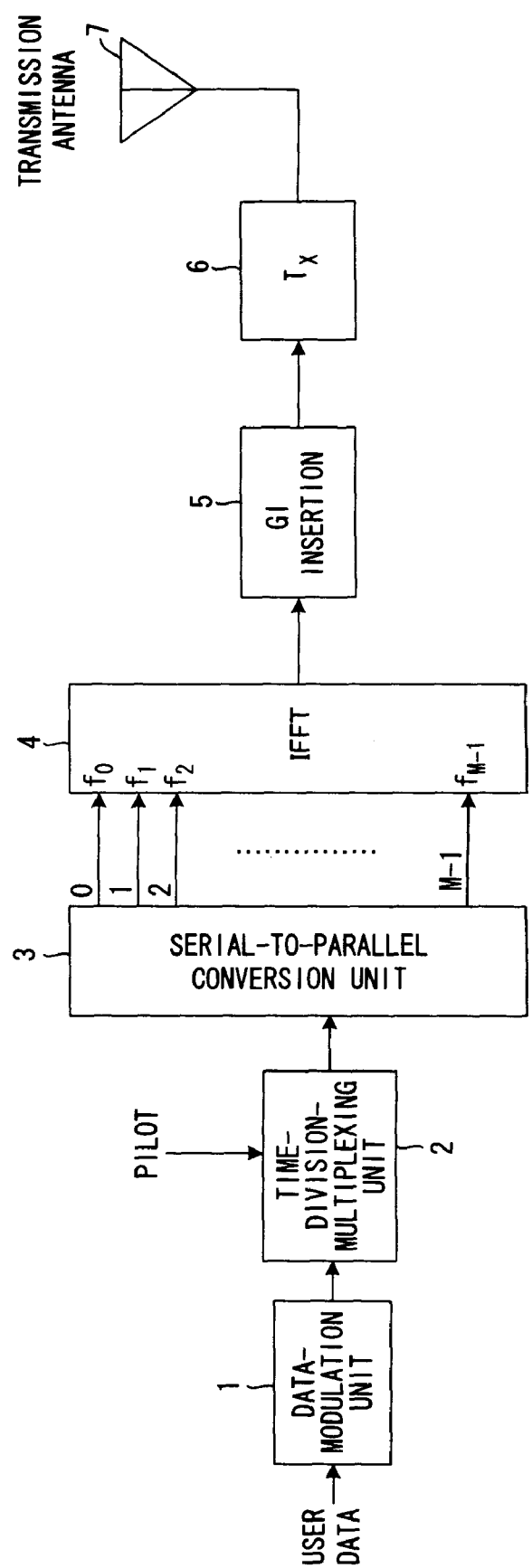
FIG. 29 is a drawing showing the construction of a transmission apparatus in an OFDM communication system.
Figure 30:
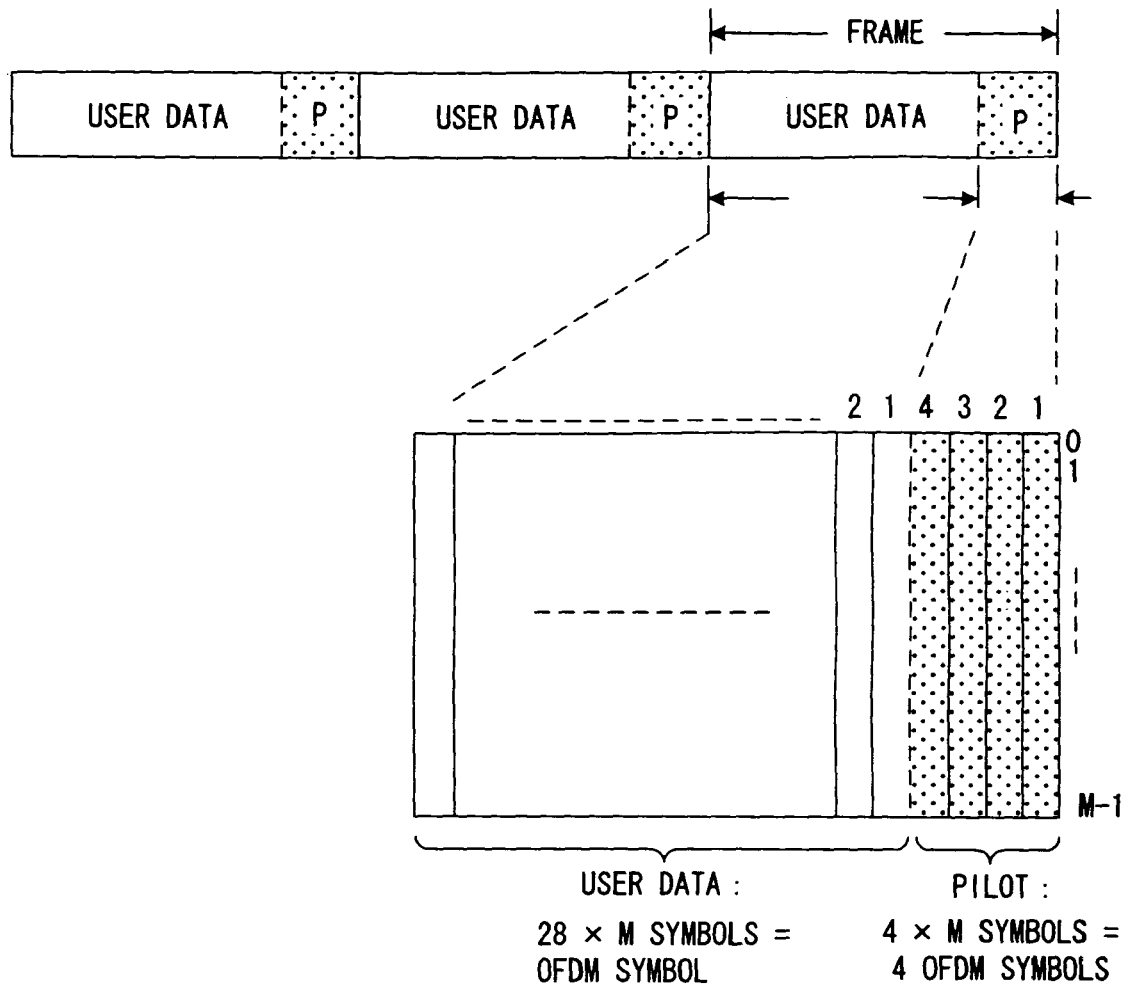
FIG. 30 is a drawing explaining serial-to-parallel conversion.
Figure 31:
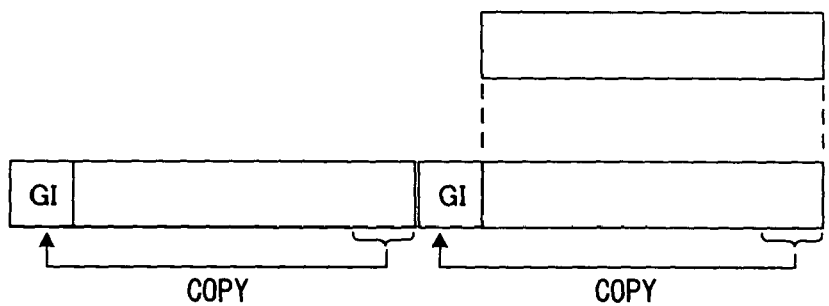
FIG. 31 is a drawing explaining the insertion of guard interval.
Figure 32:
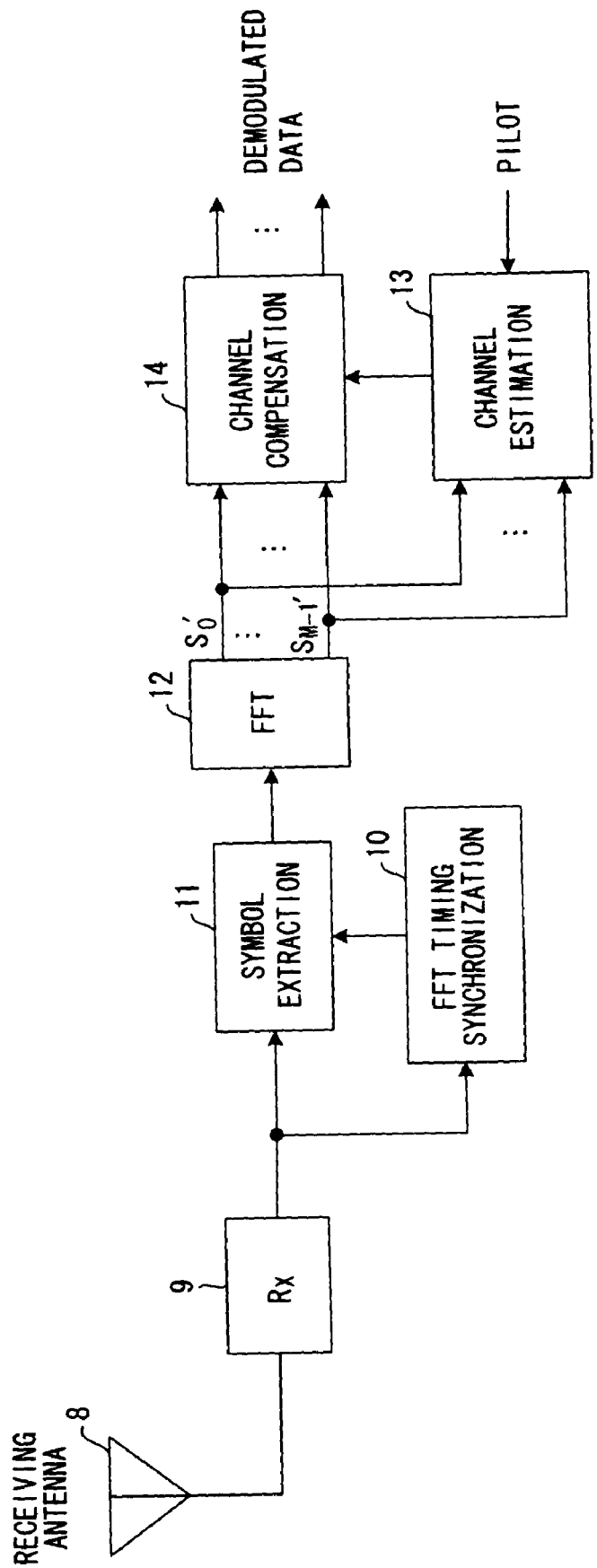
FIG. 32 is a drawing showing the construction of an OFDM receiving apparatus.

FIG. 28 is a drawing showing the construction of a base station BTS in this sixth embodiment, where the same reference numbers are used for parts that are identical with those of the base station in the first embodiment shown in FIG. 5. The differing points are: 1) there is a group/sub-carrier-setting unit 80 in the place of the frame-selection/setting unit 30; 2) the frame-pattern-generation unit 21 inputs a frame pattern FHPN of frames configured with high-speed-terminal sub carriers, and a frame pattern FLPN of frames configured with low-speed-terminal sub carriers to the mapping unit 23; and 3) the mapping unit 23 maps data for the mobile terminals in the sub carriers assigned to the mobile terminals, then performs frequency-division multiplexing and transmits the data.

As shown in FIG. 24 to FIG. 26, the frame-pattern-generation unit 21 repeatedly generates the frame pattern FHPN for frames $F_H$ and frame pattern FLPN for frames $F_L$ in which pilot symbols are inserted in appropriate places, and inputs them to the mapping unit 23.

The transmission-data-processing unit 22 performs multiplexing of control data, user data and other data (movement-speed-request data, sub-carrier-assignment data), then encodes and modulates the data and inputs it to the mapping unit 23. The mapping unit 23 obtains the sub carrier assigned to a destination mobile station for user data from the group/sub-carrier-setting unit 80, and maps that user data in that sub carrier. The OFDM-transmission unit 24 performs IFFT processing on M (=n×N) number of sub-carrier samples, then combines them and inserts a guard interval in the time signal after combining, after which the wireless-transmission unit 25 performs frequency-up conversion to convert the frequency of the baseband signal to a wireless frequency, then amplifies the signal and transmits it from the antenna 26.

The wireless-receiving unit 27 performs frequency-down conversion to convert the frequency of the wireless signal received from the mobile station to a baseband frequency, and the demodulation unit 28 demodulates the baseband signal. The received-data-processing unit 29 performs an error-correction decoding process on the demodulated result, then separates and outputs the up transmission data from the user, the control data and the movement-speed data.

The group/sub-carrier-setting unit 80 comprises a sub-carrier-setting unit 80a, movement-speed-judgment unit 80b and sub-carrier-retaining unit 80c. The sub-carrier-setting unit 80a periodically requests the movement speed from each of the mobile stations, the movement-speed-judgment unit 80b determines whether the mobile stations are moving at high speed or low speed based on the size of the movement speeds $V_{UEi}$ (i=1, 2, ... ) and the threshold value Vth and inputs the judgment results to the sub-carrier-setting unit 80a. The sub-carrier-setting unit 80a divides the mobile stations into a low-speed-terminal group and high-speed-terminal group based on their respective movement speed, then determines sub carriers to be used by the mobile stations and sets them in the sub-carrier-retaining unit 80c. The mapping unit 23 identifies a sub carrier assigned to a destination mobile station for the user data based on the contents of the sub-carrier-retaining unit 80c, and maps that user data in that sub carrier.

When movement speed is requested by the sub-carrier-setting unit 80a, the transmission-information-creation unit 31 creates movement-speed-request data and sends it to the mobile stations via the transmission-data-processing unit 22. Also, when the sub-carrier-setting unit 80a gives an instruction to notify the mobile stations of the sub carrier that has been set, the transmission-information-creation unit 31 creates sub-carrier-setting data for notifying the mobile stations of those sub carriers, and sends that data to the mobile stations via the transmission-data-processing unit 22.

With this sixth embodiment, a plurality of sub carriers is divided into two groups, where the number of common pilots, or the number of distributions of common pilots in a frame configured with sub carriers of the first group is different from that in a frame configured with sub carriers of the second group, and data is mapped in the respective frames configured with sub carriers of the first and second groups, and repeatedly sent to mobile terminals, so it is possible to use a fixed frame pattern to control the number of pilot symbols.

The explanation above is for the case where a plurality of sub carriers is divided into two groups, however, it is also possible to perform similar control so that the sub carriers are divided into three or more groups. In other words, construction can be such that a plurality of sub carriers is divided into a plurality of groups, where the number of common pilots or the number of distributions of common pilots in a frame configured with the sub carriers of each of the aforementioned groups is different, and data is mapped in each of the frames and repeatedly sent to the mobile terminals.

To sum up, with this invention the following effects are obtained:

It is possible to improve the precision of measuring the received electric field intensity for both the state of high-speed movement and the state of low-speed movement.

It is possible to improve the precision of estimating channels for both the state of high-speed movement and the state of low-speed movement.

It is possible to improve the transmission speed and throughput.

It is possible to improve the overall transmission speed and throughput of a base station.

In the embodiments described above, the case in which the frames to be used are determined based on the speed of movement was explained, however, this is not limited to the speed of movement, and construction could be such that the frames to be used are determined based on the receiving state such as the propagation environment, receiving quality, receiving power or the like.

Also, (a) and (b) of FIG. 19 show only two types of frame patterns FRPT, however, the invention is not limited to these two types, and generally, it is possible to adopt a frame pattern comprising one or more combinations of at least two types of frames in which the number of common pilots or the number of distributions of common pilots in each differs.

Moreover, in the embodiments described above, the case of communication in which sub carriers were used to perform transmission was explained, however, the present invention could also be applied to the case of communication that does not use sub carriers.

As many apparent widely different embodiments of the present invention can be made without departing from the spirit and scope thereof, it is to be understood that the invention is not limited to the specific embodiments thereof except as defined in the appended claims.

What it is claimed is:

1. A wireless mobile communication system in which data communication is performed between a wireless base station and terminals, wherein said wireless base station includes:

a transmission unit that generates a third frame by combining a first frame and a second frame in which a number of common pilots in each is different, or combining a first frame and a second frame in which a number of distributions of common pilots in each is different, maps data destined for the terminals in the first and the second frames of the third frame, and repeatedly transmits the data using the third frame; and a notification unit that notifies a terminal of which of the first frame or the second frame is used for mapping the data addressed to the terminal, and the terminal includes:

a reception unit extracts the data addressed to the terminal from the notified first or the second frame.

2. A wireless base station in a wireless mobile communication system in which data communication is performed between the wireless base station and terminals, comprising:

a transmission unit that generates a third frame by combining a first frame and a second frame in which a number of common pilots in each is different, or combining a first frame and a second frame in which a number of distributions of common pilots in each is different, maps data destined for the terminals in the first and second frames of the third frame, and repeatedly transmits the data using the third frame; and a notification unit that notifies a terminal of which of the first frame or the second frame is used for mapping the data addressed to the terminal.

3. A wireless base station that performs transmitting data with common pilots for estimating a channel to terminals in accordance with OFDM communication, comprising:

a frame-pattern-generation unit that repeatedly generates a frame pattern having a first frame and a second frame in which a number of common pilots in each is different, or in which a number of distributions of common pilots in each is different;

a buffer that stores transmission data for each of the terminals;

a mapping unit that maps data in each frame;

a multiplexing unit that performs frequency-division multiplexing, code-division multiplexing or time-division multiplexing in each frame of data for a plurality of terminals, an OFDM transmission unit that transmits said frame pattern in which data is mapped and multiplexed to the terminals;

a receiving unit that receives receiving-quality-measurement results of the terminals; and a scheduler that divides the terminals into a first terminal group and a second terminal group and performs transmission scheduling for each group based on the receiving-quality-measurement results of the terminals, wherein said mapping unit selects the transmission data for each terminal of the first terminal group from the buffer and maps the selected data in the first frame of said frame pattern based upon the result of the transmission scheduling, and further said mapping unit selects the transmission data for each terminal of the second terminal group from the buffer and maps the selected data in the second frame of said frame pattern based upon the result of the transmission scheduling.

* * * * *